United States Patent
Taniguchi et al.

(10) Patent No.: US 7,268,747 B2
(45) Date of Patent: Sep. 11, 2007

(54) ELECTRONICS WITH TWO AND THREE DIMENSIONAL DISPLAY FUNCTIONS

(75) Inventors: Keiji Taniguchi, Higashihiroshima (JP); Masaaki Sasa, Hiroshima (JP); Norio Itoh, Chiba (JP); Ryuji Kitaura, Sakura (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 697 days.

(21) Appl. No.: 10/664,153

(22) Filed: Sep. 17, 2003

(65) Prior Publication Data

US 2004/0223049 A1    Nov. 11, 2004

(30) Foreign Application Priority Data

| | | | |
|---|---|---|---|
| Sep. 17, 2002 | (JP) | ............................. | 2002-270025 |
| Sep. 17, 2002 | (JP) | ............................. | 2002-270026 |
| Sep. 17, 2002 | (JP) | ............................. | 2002-270027 |
| Sep. 17, 2002 | (JP) | ............................. | 2002-270028 |
| Sep. 24, 2002 | (JP) | ............................. | 2002-277149 |

(51) Int. Cl.
    *G09G 5/00* (2006.01)

(52) U.S. Cl. ............................. 345/6; 345/1.1; 345/1.2; 345/5; 345/169; 348/54; 349/15

(58) Field of Classification Search ................. 345/1.1, 345/1.2, 4, 5, 6, 87, 169; 38/51, 54; 349/15; 361/681; 348/51, 54
    See application file for complete search history.

(56) References Cited

U.S. PATENT DOCUMENTS

| | | | |
|---|---|---|---|
| 5,315,377 A | | 5/1994 | Isono et al. |
| 5,434,966 A | * | 7/1995 | Nakazawa et al. ........... 345/617 |
| 5,777,588 A | * | 7/1998 | Woodgate et al. ............. 345/6 |
| 5,831,765 A | * | 11/1998 | Nakayama et al. ......... 359/464 |
| 6,046,849 A | | 4/2000 | Moseley et al. |
| 6,049,424 A | * | 4/2000 | Hamagishi ................... 359/464 |
| 6,055,013 A | | 4/2000 | Woodgate et al. |
| 6,392,644 B1 | * | 5/2002 | Miyata et al. .............. 345/419 |
| 6,630,914 B1 | | 10/2003 | Tamekuni et al. |
| 6,859,219 B1 | * | 2/2005 | Sall ........................... 345/1.1 |
| 2001/0011029 A1 | | 8/2001 | Iwabuchi et al. |
| 2001/0028350 A1 | * | 10/2001 | Matsuoka et al. .......... 345/427 |
| 2003/0098832 A1 | * | 5/2003 | Fraser et al. .................. 345/87 |
| 2003/0203747 A1 | | 10/2003 | Nagamine |
| 2004/0058715 A1 | | 3/2004 | Taniguchi et al. |

(Continued)

FOREIGN PATENT DOCUMENTS

EP    0540137 A1    5/1993

(Continued)

*Primary Examiner*—Bipin Shalwala
*Assistant Examiner*—Vincent E. Kovalick
(74) *Attorney, Agent, or Firm*—Birch, Stewart, Kolasch & Birch, LLP

(57) ABSTRACT

A mobile phone is electronics with 2D and 3D display function, having a first casing and a second casing linked to allow the phone to be foldable, and including a first display unit located inside with the phone folded, and selectively switching and displaying 2D and 3D images, and a second display unit located outside with the phone folded, and displaying a 2D image. When the mobile phone is opened or open the first display unit displays an idle screen in a 3D image as desired.

18 Claims, 19 Drawing Sheets

U.S. PATENT DOCUMENTS

2005/0254702 A1    11/2005    Era

FOREIGN PATENT DOCUMENTS

| | | |
|---|---|---|
| GB | 2 358 985 A | 8/2001 |
| JP | 5-122733 A | 5/1993 |
| JP | 7-236174 A | 9/1995 |
| JP | 7-281644 A | 10/1995 |
| JP | 9-102969 A | 4/1997 |
| JP | 9-326977 A | 12/1997 |
| JP | 10-74267 | 3/1998 |
| JP | 10-123461 A | 5/1998 |
| JP | 10-221637 A | 8/1998 |
| JP | 10-221646 A | 8/1998 |
| JP | 10-229567 A | 8/1998 |
| JP | 10-239641 A | 9/1998 |
| JP | 11-75223 A | 3/1999 |
| JP | 11-164328 A | 6/1999 |
| JP | 2000-102038 A | 4/2000 |
| JP | 2001-136247 A | 5/2001 |
| JP | 2001-251403 A | 9/2001 |
| JP | 2001-258051 A | 9/2001 |
| JP | 2001-330713 A | 11/2001 |
| JP | 2002-49004 A | 2/2002 |
| JP | 2002-171189 A | 6/2002 |
| JP | 2002-199463 A | 7/2002 |
| JP | 2002-372929 A | 12/2002 |
| JP | 2003-259395 A | 9/2003 |
| JP | 2003-319043 A | 11/2003 |
| JP | 2004-112111 A | 4/2004 |
| WO | WO-2004/019621 A1 | 4/2004 |

\* cited by examiner

FIG. 6

|  |  | SCREEN DISPLAY | OPERATION |
|---|---|---|---|
| KEYS | POWER KEY | PRESS FOR SHORT PERIOD OF TIME → DISPLAY 2D SCREEN | PRESS FOR LONG PERIOD OF TIME → POWER OFF PRESS FOR SHORT PERIOD OF TIME → CLEAR |
|  | NUMERAL KEY | 2D-DISPLAY NUMERAL | INPUT NUMERAL |
|  | # KEY | 2D-DISPLAY # | # KEY OPERATION |
|  | * KEY | 2D-DISPLAY * | * KEY OPERATION |
|  | PHONE CALL KEY | DISPLAY PHONE CALL SCREEN (2D) | MAKE PHONE CALL |
|  | MAIL KEY | DISPLAY MAIL MENU (2D) | MAIL KEY OPERATION |
|  | CAMERA KEY | DISPLAY SHOOTING SCREEN (2D) | START SHOOTING MODE |
|  | OTHER KEY | DISPLAY 2D SCREEN |  |
| INPUTS | PHONE CALL RECEPTION | DISPLAY PHONE CALL RECEPTION SCREEN (2D) |  |
|  | MAIL RECEPTION | DISPLAY MAIL RECEPTION SCREEN (2D) |  |
|  | ALARM TURNED ON | DISPLAY ALARM (2D) |  |

ELECTRONICS WITH TWO AND THREE DIMENSIONAL DISPLAY FUNCTIONS

CROSS-REFERENCE TO RELATED APPLICATIONS

This Nonprovisional application claims priority under 35 U.S.C. § 119(a) on Patent Application Nos. 2002-270025, 2002-270026, 2002-270027, 2002-270028, and 2002-277149 filed in Japan on Sep. 17, 2002; Sep. 17, 2002; Sep. 17, 2002; Sep. 17, 2002; and Sep. 24, 2002; respectively, the entire contents of which are hereby incorporated by reference.

BACKGROUND OF THE INVENTION

1. Field of the Invention

The present invention relates generally to electronics and particularly to electronics with two-dimensional (2D) and three dimensional (3D) display functions.

2. Description of the Background Art

In recent years mobile terminals, mobile personal computers (mobile PCs), mobile phones and other similar mobile equipment, and desktop or similar information equipment, and furthermore a variety electronics including audio and video equipment are increasingly enhanced in function.

A conventional mobile phone is a 3D display-equipped mobile phone with a 3D display function that can switch 2D and 3D representations for display. For example, as disclosed in Japanese Patent Laying-Open No. 2001-251403, 2D and 3D representations are switched by allowing a lenticular lens arranged above a liquid crystal display corresponding to a display unit to be movable to allow a 2D display portion's display region and a 3D display portion's display region to be changeable.

Normally when a mobile phone is not used as a telephone a screen referred to as an idle screen is set as a default screen. An idle screen can be set by a user, as desired, by selecting an image previously registered, an image obtained via a camera, or an image downloaded at a website, by mail or the like via a browser.

Furthermore, the idle screen displayed on the display can be switched for example by pressing a key to an operating screen or a setting screen, as required.

For the 3D display-equipped mobile phone with a 3D display function as described above, an idle screen displayed three dimensionally is proposed.

With reference to FIGS. 14-19, a configuration of a 3D display switchable between 2D and 3D representations will be described.

FIG. 14 shows a layout of pixels of a liquid crystal device (a liquid crystal display (LCD)) of a standard type. An LCD is used in a color display and configured of pixels of red, green and blue represented by R, G and B, respectively. With reference to the figure, the pixels are arranged in columns Col0 to Col5 formed of red, green and blue pixels arranged vertically. Of the pixels, the leftmost column Col0 displays the leftmost strip of an image displayed by the liquid crystal device and the right-hand column Col1 displays the next column of the image, . . . , and so on.

FIG. 15 shows a display used to provide a 3D stereoscopic representation. With reference to the figure, the 3D display includes a liquid crystal display device 101 (including a polarization plate) acting as a spatial optical modulator adjusting light from a backlight 102 in accordance with content of an image to be displayed. A parallactic optical system cooperates with liquid crystal display device 101 to form a viewing window. FIG. 15 shows a configuration of a 3D, automatic, stereoscopic display of a front parallax barrier type having a parallax barrier 103 as a parallactic optical system. Parallax barrier 103 includes a plurality of slits extending vertically and laterally equally spaced and also arranged in parallel. Each slit is located at a center of a pair of columns of pixels of a color and that of pixels of a different color. For example in FIG. 15 a slit 104 is located at a center of a blue pixel column 105 and a green pixel column 106.

To ensure that right and left viewing windows are properly arranged, right and left image data are supplied by the method shown in FIG. 16 to liquid crystal display device 101 of the FIG. 15 type. In FIG. 16, color image data of a leftmost strip of a left image is displayed by a red, green and blue pixel column Col0 LEFT. Likewise, color data of a leftmost strip of a view for the right eye is displayed by a pixel column Col0 RIGHT. The FIG. 16 arrangement ensures that right and left views' image data are sent to appropriate right and left viewing windows. This arrangement also ensures that three pixel colors R, G, B are all used to display each view strip.

Thus in the FIG. 16 layout, as compared with the FIG. 14 layout, the leftmost column's red and blue pixels display a left view's image data while the same column's green pixel displays a right view's image data. In the right-hand column, red and blue pixels display the right view's image data while a green pixel displays the left view's image data. Thus if a liquid crystal display device of a standard type shown in FIGS. 14-16 is used, it is necessary to "exchange" a green component between RGB pixel columns to interlace right and left views' image data. It is a matter of course that for some display settings, red or green component may be exchanged.

FIG. 17 shows a configuration of a portion of a display controller. With reference to the figure, data to be displayed is supplied on a data bus 120 serially. An address that defines an arrangement on a screen of pixel is supplied on an address bus 121. Data bus 120 is connected to an input port of several banks of memory (video random access memory (VRAM)) 122, 123 or similar RAM (in FIG. 17, two such memories are shown). Address bus 121 is connected to a memory management system 124, which converts a screen address to a memory address supplied to an address input of memory 122, 123.

Memory 122, 123 has an output port connected via a latch circuit 130 to a first in first out (FIFO) register 124 of a video controller 126. Memory 122, 123 and register 125 are so controlled that individual pixel data are read from memory 122, 123 alternately and supplied in a proper order to a display memory (VRAM) 127 located between the display controller and liquid crystal display device 101 to serve as a memory for display temporarily storing data to be displayed that have been rearranged.

FIG. 18 shows latch circuit 130 more specifically. With reference to the figure, latch circuit 130 includes a latch 140 connected to an output port of memory 122 and a latch 141 connected to an output port of memory 123. Latch 140, 141 each includes 24 1-bit latches arranged in groups of eight latches to latch R, G, B data received from their respective memories. Latch 140, 141 has an input port connected to an output port of timing generator 128 to receive from timing generator 128 a plurality of latch enable signals L at a single input port collectively.

Latch circuit 130 further includes three switching circuits 142, 143, 144 corresponding to R, G, B data, respectively, and switching a connection between register 125 and latch circuit 140 or 141. Switching circuits 142, 143, 144 each include eight distinct switching elements each receiving a plurality of control inputs collectively. Switching circuit 142, 143, 144 has an input port connected to an output port of timing generator 128 to receive from timing generator 128 a plurality of control inputs, a switching signal SW, at a single input port collectively. Timing generator 128 has an additional output port to supply a write enable signal F with register 125. Herein, it should be noted that switching circuit 143 corresponding to G data switches to one of latch circuits 140, 141 while the other switching circuits 142, 144 switches to the other of the latch circuits.

If data to be displayed is available at the memory 122, 123 output port, latch enable signal L attains the high level. Thus latches 140, 141 latch the data. Immediately after latch enable signal L returns low, switching signal SW goes high. Then, switching circuits 142, 143, 144 are switched as shown in FIG. 18 and latch 140 and register 125 are connected together to allow latch 140 to have R, G, B data output to register 125. Subsequently, write enable signal F is supplied to register 125 and the RGB data from latch 140 are written to register 125. Subsequently, write enable signal F is rendered unavailable to prevent further data from being written to register 125 before a subsequent write enable signal is issued.

Then, switching signal SW is set low and switching circuits 142, 143, 144 connect latch 141 and register 125 together to allow latch 141 to have R, G, B data output to register 125. Further write enable signal F is generated and the data from latch 141 are written to register 125. Note that the data having written to register 125 is concurrently written to memory 127. Subsequent latch enable signal L goes high and a similar process is repeated. Thus data are written from memories 122, 123 alternately to register 125. Memory 127 also receives written data from register 125 and has the data written therein successively. This repeats until data required to display a single screen are all written in memory 127.

2D data or a monoscope's data that must be displayed for a viewer's both eyes is written to memory 127, as follows: in that case, the parallactic optical system by means of parallax barrier 3 is removed. A monoscope's pixel data is directly input to and stored in memory 127 for display shown in FIG. 17 to perform a write to memory 127. In a 3D display mode, an image for the right eye and that for the left eye each has a resolution corresponding to a half of a horizontal spatial resolution of liquid crystal display device 101. Accordingly, if the display controller operates in a 2D or monoscope mode, an image, as compared with a 2D image, will have a resolution twice a lateral resolution of liquid crystal display device 101.

Note that the parallactic optical system may be formed selectively. FIG. 19 shows a specific example of a display device so configured that the parallactic optical system's selective formation allows 2D and 3D images to be electrically switched and displayed. Herein, for the parallactic optical system, for example for the above a 2D/3D switching liquid crystal device LCD 150 and a patterned phase different plate 141 such as shown in the figure are used. Liquid crystal device 150 herein is a flat electrode for switching an entire surface to 3D, 2D. Phase difference plate 151 replaces one of two polarizing plates included in the liquid crystal device. In FIG. 19, a portion substantially identical in function to that shown in FIG. 15 are labeled identically. While in the FIG. 19 example a parallax barrier 103a is arranged at a rear side of liquid crystal display device 101, i.e., closer to a backlight 102, the barrier 103a may be arranged at a front side of the device 101, as shown in FIG. 15.

When the display device configured as shown in FIG. 19 is used to display a 3D image, voltage is not applied to liquid crystal device 150. Thus an internal liquid crystal molecule maintains a rotating state and a slit substantially similar to slit 104 of parallax barrier 103 of FIG. 15 is formed by a characteristic of polarization of light relative to phase difference plate 151 in accordance with the plate's pattern.

When the display device configured as shown in FIG. 19 is used to display a 2D image, voltage is applied to liquid crystal device 150. This liberates the liquid crystal molecule from rotation and phase difference plate 151 is not affected by light input to the plate, whether it may have a pattern or not, so that the formation of the slit is resolved. Thus a 2D image can be displayed.

Alternatively, as described in Japanese Patent Laying-Open No. 5-122733 or 7-236174, a liquid crystal display device including a pair of polarizing plates for switching between 2D and 3D representation may be used and as the device's display pattern a pattern similar to parallax barrier 103 may be rendered displayable and displayed selectively.

Note that in a 3D automatic stereoscopic display with a fixed parallactic optical system, as shown in FIG. 15, with parallax barrier 103 attached thereto, right and left video images to be displayed which are identically provided allow this display to display a substantially 2D image. In this case, however, the display itself still has a parallactic optical system formed therein and in displaying in a 2D image when the user observes the representation it will be affected by the system disadvantageously.

By contrast, a display device selectively forming a parallactic optical system, as shown in FIG. 19, advantageously eliminates an effect of parallax in displaying in a 2D image. More specifically, with a display device configured as shown in FIG. 19, when displaying in a 2D image is selected a device configuration is provided that is substantially similar to a normally used liquid crystal display device, free of a parallactic optical system formed at a portion or entirety of a region for display. Without effect of parallax of right and left, a ready visual observation can be achieved at any position.

Thus for a device switching and displaying each image of 2D and 3D images it is necessary for example to switch an operation of 2D/3D switching liquid crystal device 150 corresponding to a component of a parallactic optical system and also change a configuration of data input to memory 127 for display.

A 3D screen in a device allowing 2D and 3D images to be switched and displayed can be displayed in a 3D format by inputting in a 3D image display mode the data for the right eye to be displayed and that for the left eye to be displayed to a video controller 126 and rearranging the data in the controller.

This is also applied when the 3D image display mode is set and the user selects and reproduces as desired an image previously registered, an image obtained via a camera or the like, or an image downloaded at a website, by mail or the like via a browser.

However, for an alarm time indication or on a phone call reception screen or a mail reception screen mainly displaying characters, a 3D image can prevent ready recognition of the characters. In particular, in phone call reception, mail reception or similarly displaying a large number of characters, a 2D image rather than a 3D image would help the user to recognize the characters and rapidly identify their contents.

Furthermore in such a 3D format an indication needs to be observed in a specific direction. This can be difficult when the user continues to see the indication for a long period of time.

Furthermore, when a 3D stereoscopic representation can be difficult to observe as the user is on a moving vehicle, or it is exhausting to continue to see a displayed 3D image for a long period of time, or the user inherently cannot construct a stereoscopic body in a 3D image in his/her mind, switching the representation to a 2D image and displaying it may be desired. Furthermore, if a representation in a 2D image can be switched to that providing a sense of depth, i.e., that in a 3D image, it would give an impact on the user and provide an enjoyable representation.

Note that a mobile flip phone corresponding to the device has been developed to provide multiple display, and there has been proposed a flip phone with a main display unit used with the phone flip open as well as a subordinate display unit arranged on an external side of the phone and usable with the phone closed.

SUMMARY OF THE INVENTION

Therefore one object of the present invention is to provide electronics such as mobile phones capable of switching and displaying a 3D image and a 2D image helping users to recognize its content.

Another object of the present invention is to provide electronics displaying a screen in a 3D image that can automatically switch from a 3D screen to a 2D screen helping users to identify its content when previously set alarm time notice or phone call reception, mail reception or the like occurs.

Still another object of the present invention is to provide electronics capable of selectively switching and displaying 2D and 3D images that can compulsorily switch a representation in a 3D image to that in a 2D image for example via a key entry, at a time previously set by a timer, or the like.

Still another object of the present invention is to provide electronics displaying a screen in a 3D image that allows a displayed 3D screen to be switched by pressing a key to an indication of a screen other than 3D and when an entry via the key is also required it can be achieved simultaneously with pressing the key.

Still another object of the present invention is to provide electronics such as mobile phones having a main display unit provided by a device displaying each image of 2D and 3D images and a subordinate display unit only capable of displaying a 2D image, as conventional, that displays an idle screen in a 3D image.

The above objects of the present invention can be achieved by electronics including the following components. More specifically, the electronics include: a display portion switching and displaying a two-dimensional image and a three-dimensional image; a detection portion detecting a variation in position of the electronics; and a switching portion operative in response to the detection portion detecting the variation to switch a screen displayed on the display portion from a three-dimensional image to a two-dimensional image.

Furthermore the above objects of the present invention can also be achieved by the electronics including the following components. More specifically the electronics include: a display portion selectively switching and displaying a two-dimensional image and a three-dimensional image; and a portion compulsorily switching a representation, compulsorily switching to a two-dimensional image a three-dimensional image displayed on the display portion.

Furthermore the above objects of the present invention can also be achieved by the electronics including the following components. More specifically the electronics include: a display portion selectively switching and displaying a two-dimensional image and a three-dimensional image; a key entry portion for operation operated for input for an operation; a control portion controlling switching between two-dimensional and three-dimensional formats, operative, with the display portion displaying a screen in a three-dimensional image, in response to an entry via at least any key of the key entry portion to effect a process corresponding to the entry, and an entry via a key other than the any key to switch the screen on the display portion in the three-dimensional image to a screen in a two-dimensional image.

Furthermore the above objects of the present invention can also be achieved by the electronics including the following components. More specifically the electronics include: a display portion depending on a selection of formation of a parallactic optical system to switch and display a two-dimensional image and a three-dimensional image; a representation switching portion issuing an instruction to switch a representation on the display portion between a two-dimensional image and a three-dimensional image associated with the parallactic optical system; and a data generation portion operative in response to the instruction to generate data of an indication in a two-dimensional image and that of an indication in a three-dimensional image from single data.

Furthermore the above objects of the present invention can also be achieved by the electronics including the following components. More specifically the electronics are electronics with a first casing and a second casing linked to allow the electronics to be foldable, including: a first display portion located inside with the electronics folded, and selectively switching and displaying a two-dimensional image and a three-dimensional image; a second display portion located outside with the electronics folded, and displaying a two-dimensional image; and a control portion operative in response to the electronics being folded or opened to switch an indication of an idle screen on the first display portion in a three-dimensional image and that of an idle screen on the second display portion in a two-dimensional image.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 6 illustrates in a list an indication of a screen in mobile phone 1 of the present invention in a first embodiment and an operation of the phone when each key is pressed, or alarm notice or phone call or mail reception or the like is input;

DETAILED DESCRIPTION OF THE INVENTION

Preferred embodiments of the present invention will now be described with reference to the drawings.

FIRST EMBODIMENT

Figure 1:
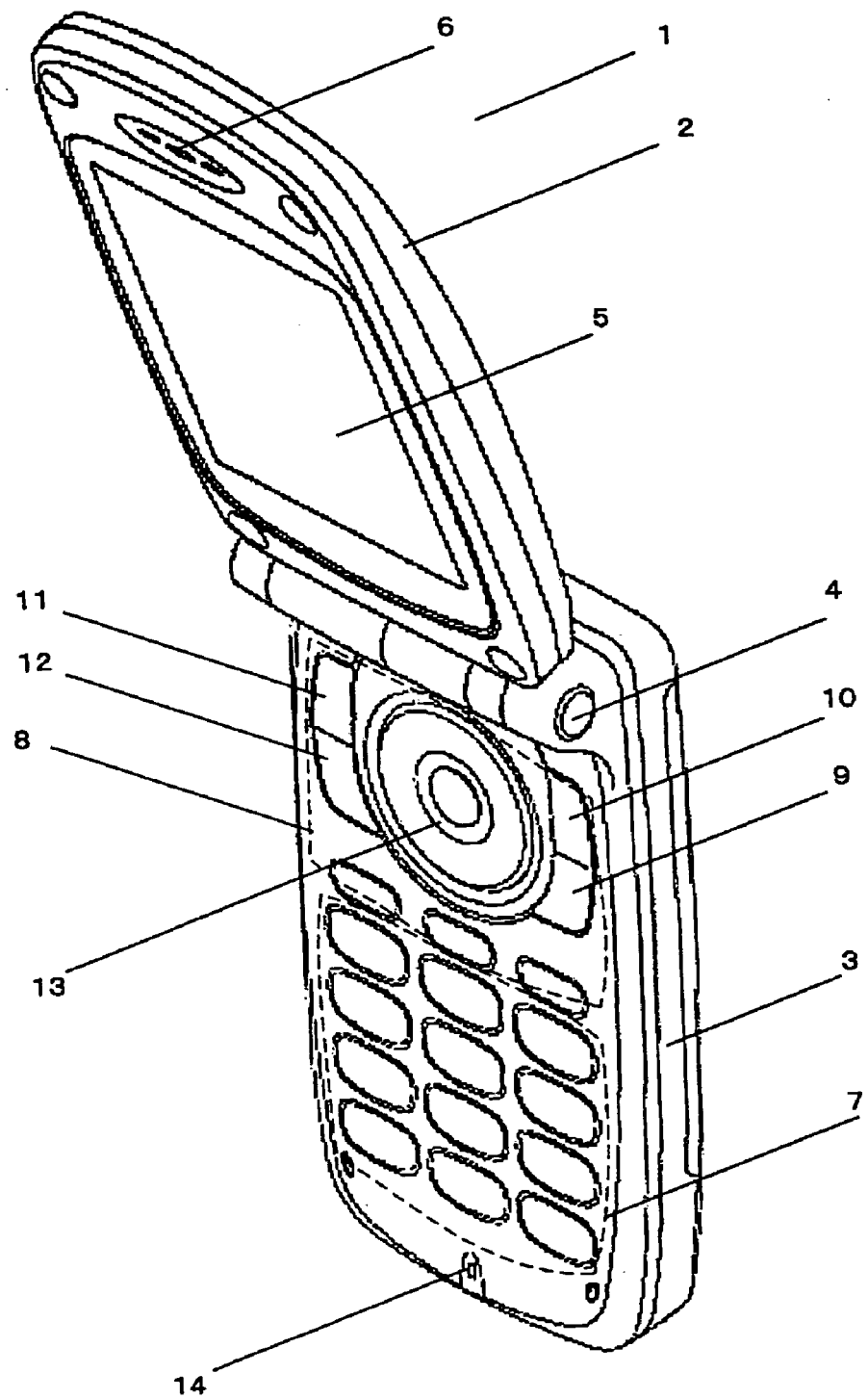
FIG. 1 is a perspective view showing a specific example of an appearance of a mobile phone 1 in an embodiment of the present invention.

FIG. 1 is a perspective view of an appearance of a camera equipped clamshell mobile phone 1 of the present invention in a first embodiment, as flipped open.

With reference to FIG. 1, a mobile phone 1 of the present invention includes a first casing 2 and a second casing 3, coupled via a hinge 4. Mobile phone 1 has a foldable configuration through the movement with hinge 4 as the axis in angular displacement. Mobile phone 1 includes a first display unit 5 at first casing 2. First display unit 5 is arranged so as to be located at an inner side when mobile phone 1 is folded. The first display unit is a display device configured to be capable of switching and displaying 2D and 3D images by electrically selecting the presence/absence of the formation of a parallactic optical system and displays an image based on image data transmitted via a first display driver 43 that will be described hereinafter. A first speaker 6 used in conversation is provided at an upper region of first display unit 5.

Second casing 3 of mobile phone 1 of the first embodiment will be described hereinafter. With reference to FIG. 1, an input button group 7 is formed of keys and the like to enter numerics and characters. A function button group 8 is a group of buttons for performing various kinds of setting and function selection in mobile phone 1. Function button group 8 includes a power button 9 to turn on/off the power, first shutter button 10 corresponding to a camera function, a mail/guidance button 11 corresponding to mail function and guidance display, a start/speaker conversation button 12 to initiate conversation through speaker receiver, and a multi-guide button 13 formed of 4-way buttons and a determination button to select the vertical and horizontal directions and determination in a function select screen. A mouthpiece microphone 14 is provided at the lower region of second casing 102.

Second casing 3 of mobile phone 1 generally has hinge 4, function button group 8, input button group 7, and mouthpiece microphone 14 arranged in this order. However, the arrangement is not limited thereto.

Figure 2:
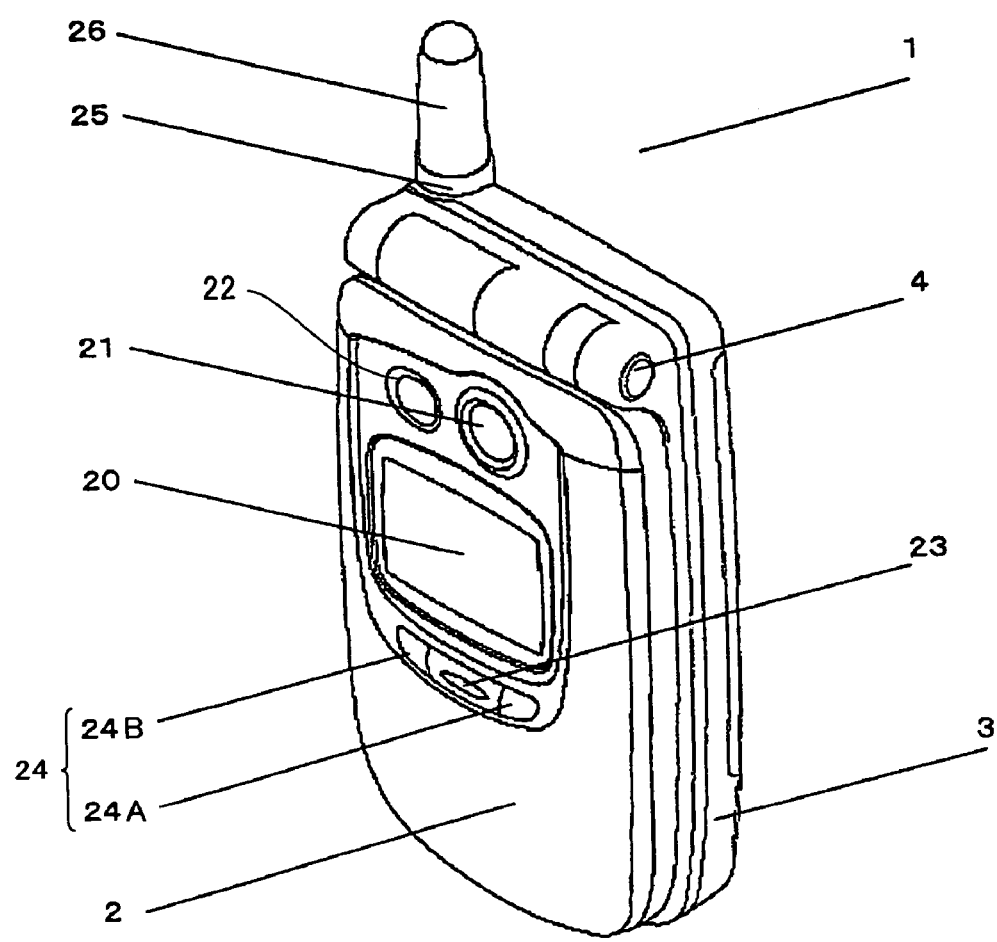
FIG. 2 is a perspective view of a specific example of the appearance of mobile phone 1 closed.

FIG. 2 is a perspective view of an appearance of mobile phone 1 folded. As shown in FIG. 2, the back side plane of first casing 2 has a camera unit 21 and a light unit 22 arranged in order from the side of hinge 4. Then, a second display unit 20, a second shutter button 23, and a second operation button group 24 are arranged in this order.

Second display unit 20 is arranged so as to be located at the outer side when mobile phone 1 is folded. Second display unit 20 is implemented with a liquid crystal display, an electroluminescence (EL) display, or the like. Second display unit 20 displays an image based on image data of a picked-up image transmitted via a second display driver 44 that will be described afterwards, time information, radio field intensity, and character images of mail reception display. When such images are to be displayed on second display unit 20, the image data transmitted from second display driver 44 to second display unit 20 is properly displayed on second display unit 20 so that the hinge 4 is located upper than the display. By displaying an image in second display unit 20 so that hinge 4 is located at the upper side, the user will hold mobile phone 1 with hinge 4 located at the upper side when used in a folded state. Therefore, the orientation of second casing 3 does not change even when used in an open state or closed state of mobile phone 1. In other words, the user does not have to change his/her hand holding position of mobile phone 1 each time he/she opens or closes mobile phone 1. Therefore, the operability and convenience are improved. Images displayed on second display unit 20 can include a picked-up image. When the user wants to look at the picked-up image, the user no longer has to alter the orientation or change the hand holding position of mobile phone 1. Thus, operability and convenience are improved.

Camera unit 21 includes an image sensing lens, an image sensing device such as a charge coupled device (CCD) image sensor or a complementary metal oxide semiconductor (CMOS) image sensor, and a color filter of the three colors of RGB. In camera unit 21, the light reflected from a subject of image pick up enters the image sensing lens to be converted into light of the three colors of RGB through a color filter, and further provided to the image sensing device. As shown in FIG. 2, camera unit 21 is arranged between hinge 4 and second display unit 20 to be located at the outer side when mobile phone 100 is folded. When the user takes a picture with mobile phone 1 open, the user will conduct shooting holding second casing 3.

Light unit 22 is used as an auxiliary light source when shooting is conducted through camera unit 21. Although many generally employ xenon tubes, recent mobile phones have the light emitting diodes (LEDs) of RGB illuminated at the same time to provide white light illumination used as the auxiliary light source.

Second shutter button 23 is arranged at the middle of the back side plane of first casing 2, and is located below second display unit 20 in the state where mobile phone 1 is folded, as shown in FIG. 2. By arranging second shutter button 23 at this position, the user can easily identify the shutter button position with mobile phone 1 in a folded state. Therefore, the shooting operation is facilitated.

To the left and right of second shutter button 23 are provided second operation button groups 24A, 24B for various setting/operation using second display unit 20. Second operation button group 24A, 24B is co-operative with second display unit 20 to perform various setting of functions, display and retrieval in an address list, and mail check and display and dispatch. Also, zooming during shooting, front and back forwarding of a plurality of picked-up images, and the like can be operated.

An antenna unit 25, a helical member 26 that can move vertically, a battery unit (not shown) to store a battery, and a second speaker (not shown) to sound a ringing tone are provided at the back side plane of second casing 3.

First casing 2 is mechanically connected with second casing 3 through hinge 4. A flexible substrate to establish electrical connection between first and second casings 2 and 3 is incorporated in hinge 4.

Figure 3:
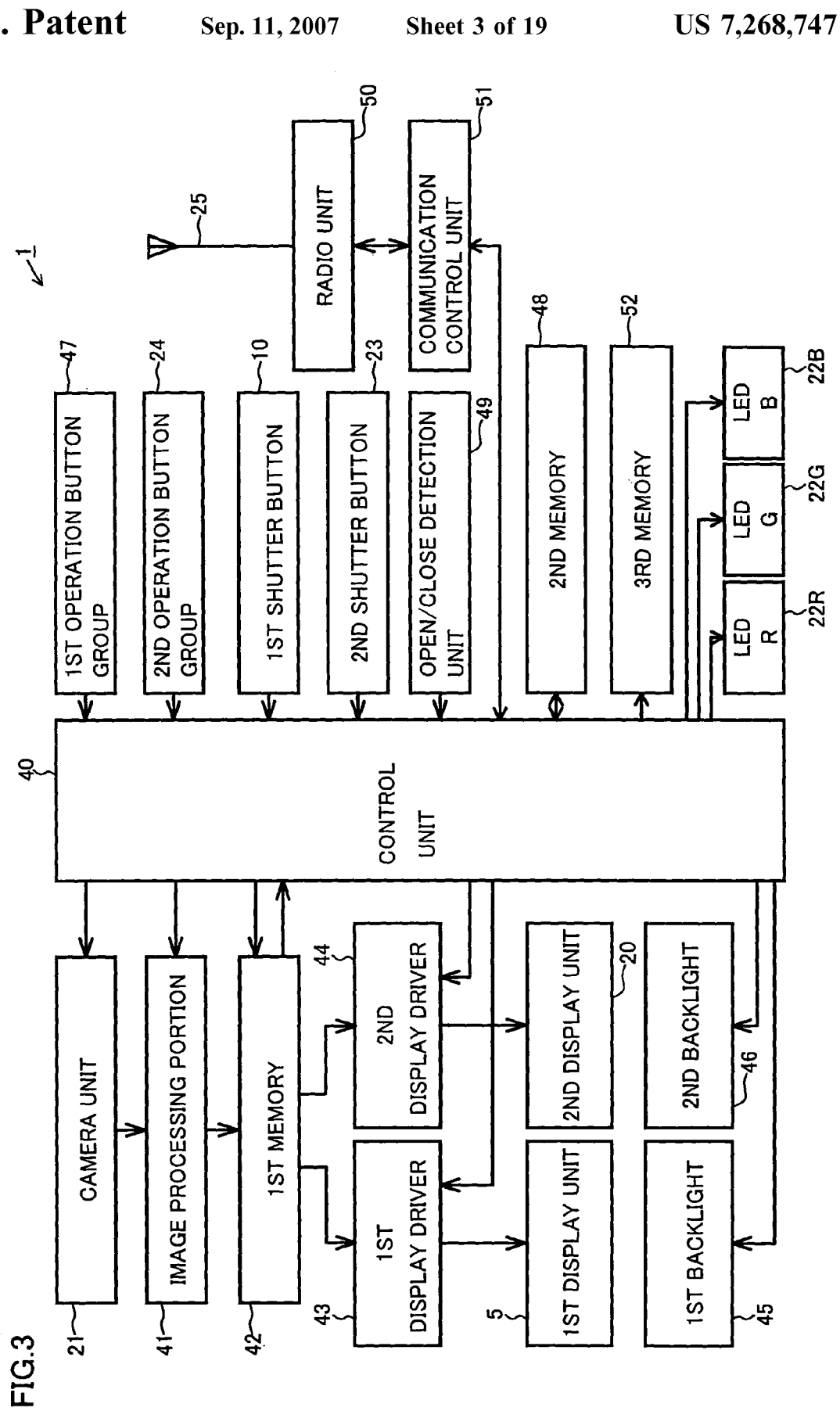
FIG. 3 is a block diagram showing a specific example of a configuration of mobile phone 1.

FIG. 3 shows a specific example of an internal circuit configuration of mobile phone 1.

With reference to the figure, control unit 40 outputs a control signal to each constituent of mobile phone 1 to control operation. Control unit 40 corresponds to control means, shutter button control means, backlight control means, light control means, and display control means.

Camera unit 21 and image processing portion 41 correspond to imaging means, converting incident light to an electrical signal and outputting it as image data An image processing portion 41 includes an amplifier, an A/D (Analog/Digital) converter, and a signal processor. The amplifier amplifies electrical signals corresponding to RGB sent from camera unit 21 and provides the amplified signals to the A/D converter. The A/D converter converts an analog, electrical signal corresponding to RGB amplified at the amplifier into a digital signal to output image data, which is provided to the signal processor. The signal processor subjects the image data from the A/D converter to signal processing such as pixel interpolation processing. The signal processor transmits the image data subjected to signal processing to a first memory 42 based on a control signal from control unit 40. First memory 42 temporarily stores image data continuously sent from the signal processor. Temporary storage is conducted by, for example, erasing the oldest image data, or by overwriting old image data with the most recent image data.

Control unit 40 outputs a control signal to first and second display drivers 43 and 44, and provides the image data stored in first memory 42 to first and second display drivers 43 and 44. First and second drivers 43 and 44 apply driving voltages to respective pixel electrodes of first and second display units 5 and 20 in accordance with the image data that is to be displayed at first and second display units 50 and 20.

First and second backlights 45 and 46 are formed of light emitting diodes or the like that are luminous elements to direct light on first and second display units 5 and 20 to increase the luminance. Turning on and off first and second backlights 45 and 46 as well as luminance adjustment and the like are under control of control unit 40.

First operation button group 47 includes the aforementioned input button group 7 and function button group 8 of second casing 3. Second operation button group 24 is provided at first casing 2, as described before.

First and second shutter buttons 10 and 23 are pressed by the user when image data that is to be saved among the image data continuously provided and temporarily stored in first memory 42 is to be stored in third memory 52, and first and second shutter buttons 10 and 23 output to control unit 40 a signal indicating that the image data is stored. Control unit 40 responds to the signal from first and second shutter buttons 10 and 23 to store the image data present in first memory 42 into third memory 52. Note that second memory 48 is used as well as first memory 42 in displaying image data.

Open/close detection unit 49 detects whether mobile phone 1 is folded or not. It corresponds to detection means. A detection switch (not shown) is provided in hinge 4 and a signal of a resultant detection corresponding to the phone's open/closed positions is output from open/close detection unit 49 to control unit 40. Control unit 40 is driven by the detection to determine whether mobile phone 1 is folded.

Antenna unit 25 transmits and receives voice data, text data, image data and the like when establishing radio communication with a base station through radiowaves. A radio unit 50 demodulates data received from a base station via antenna unit 25 in a reception mode, and transmits text data and image data from a communication control unit 51 to control unit 40 based on a predetermined protocol in a reception mode. Data received from another party via radio unit 50 and communication control unit 51 is stored in third memory 52.

Control unit 40 switches the display unit to display an image based on the image data temporarily stored in first memory 42 in response to the detected result of open/close detection unit 49. When detection is made that mobile phone 1 is folded by open/close detection unit 49, control unit 40 provides the image data from first memory 42 to second display driver 44 to display an image at second display unit 20. When detection is made that mobile phone 1 is not folded (open) by open/close detection unit 49, control unit 40 provides the image data from first memory 42 to first display driver 43 to display an image at first display unit 5.

Camera unit 21 is provided so as to be located at the outer side when mobile phone 1 is folded. When a picture of a subject other than the user of mobile phone 1 is to be taken, the user aims camera unit 21 with mobile phone 1 in an open state towards the subject located opposite to the user. In this context, open/close detection unit 49 detects that mobile phone 1 is open, i.e., not folded. Therefore, an image based on image data output from camera unit 21 is displayed at first display unit 5. Accordingly, the user, who is taking a picture, can use first display unit 5 as the viewfinder in the shooting operation.

In the case where the user of mobile phone 1 is to take a picture of himself/herself, the user aims camera unit 21 to himself/herself with mobile phone 1 in a folded state. In this context, open/close detection unit 49 detects that mobile phone 1 is folded. Therefore, an image based on image data output from camera unit 21 is displayed at second display unit 20. Accordingly, the user, who is taking a picture, can use second display unit 20 as a viewfinder in the shooting operation. Note that in accordance with the first embodiment mobile phone 1 can also pick up an image of the user in an open position.

Figure 17:
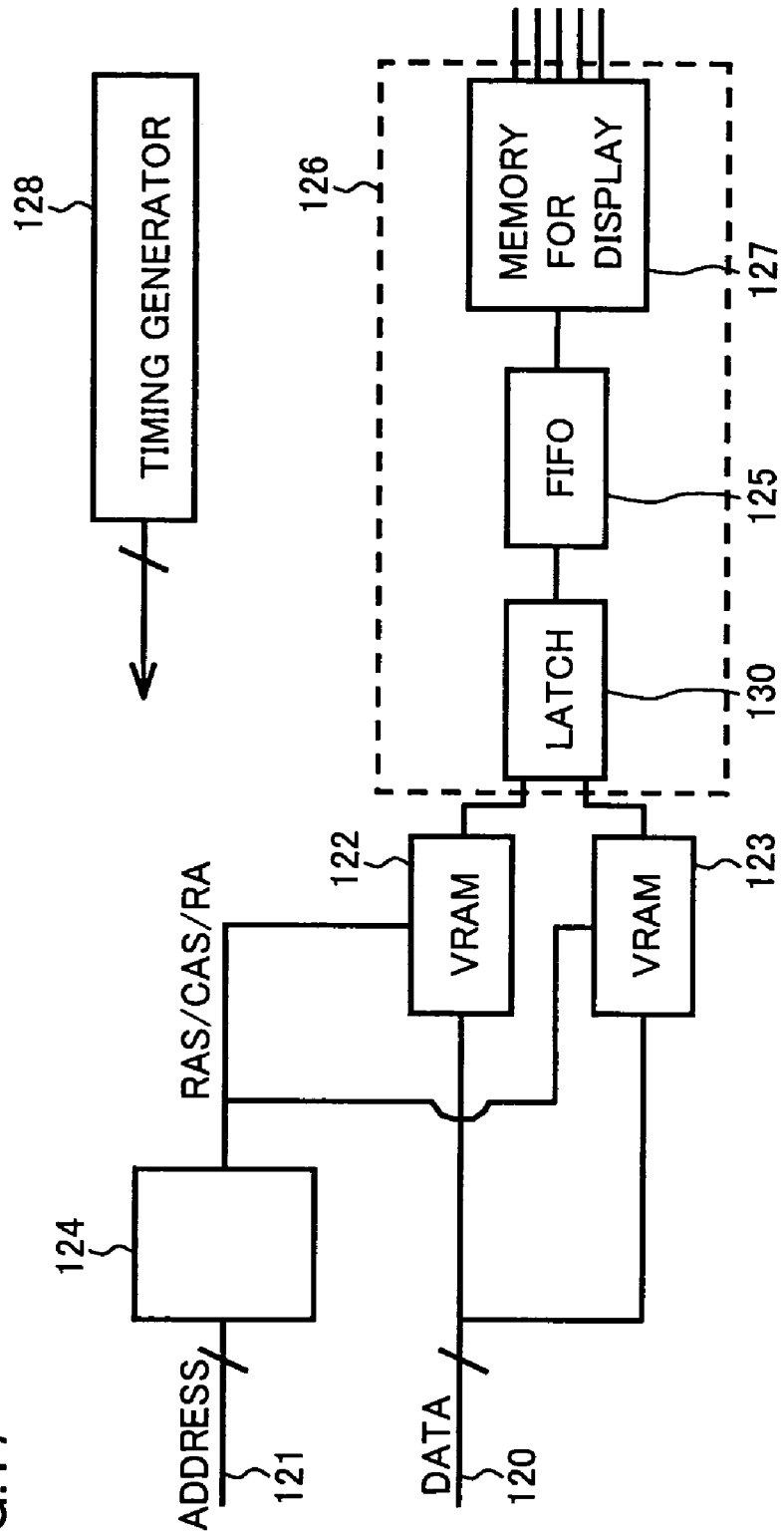
FIG. 17 is a block diagram showing a specific example of a configuration of a display controller.
Figure 18:
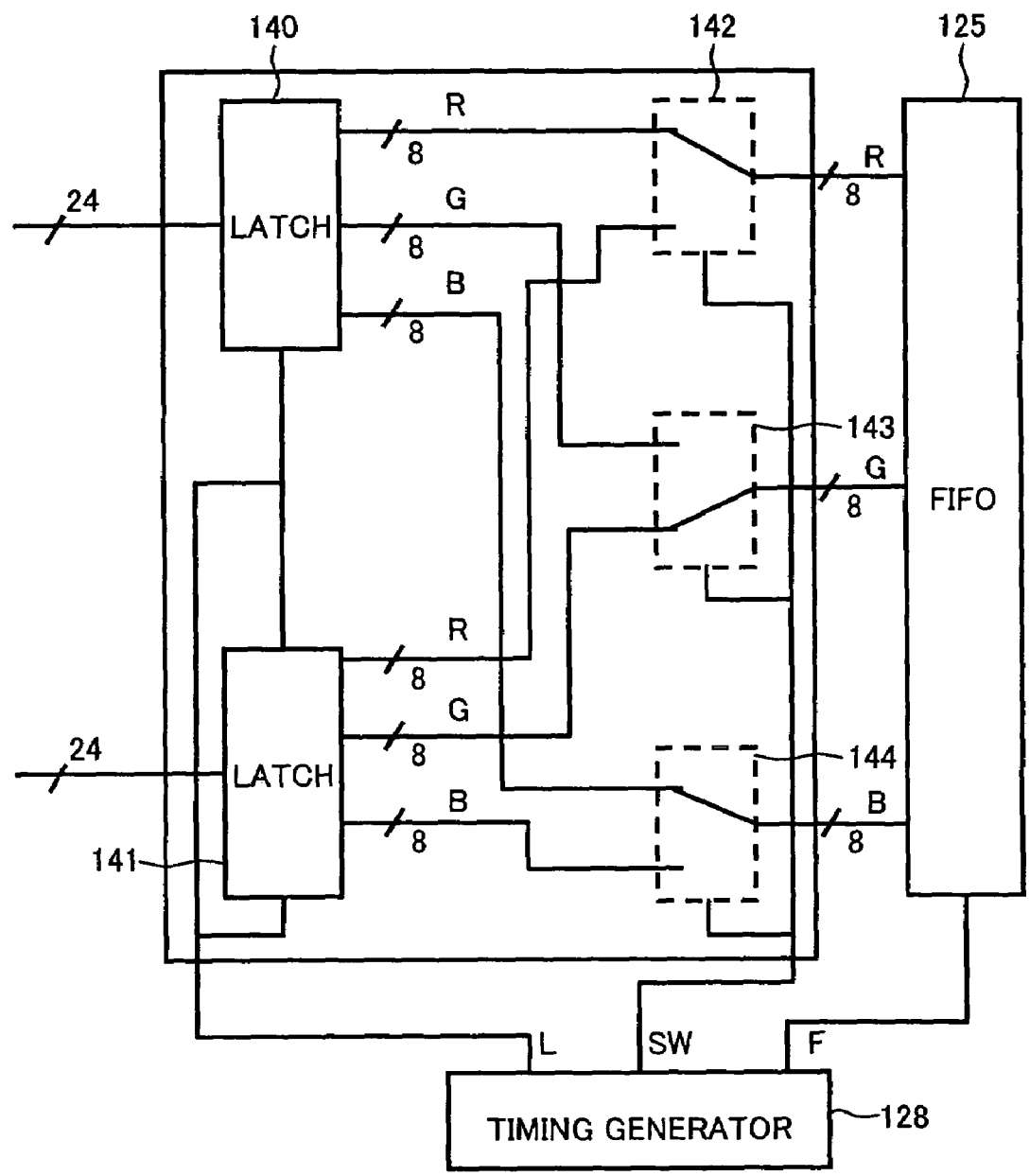
FIG. 18 is a block diagram showing a specific example of a configuration in detail of a portion of the display controller.

First display unit 5 is, as described with reference to FIG. 19, configured of a display device capable of switching and displaying 2D and 3D images by selectively forming a parallactic optical system. Second display unit 20 is configured of a typical display device displaying only a 2D image. First display unit 5 is connected to a first display driver 43 configured to include memories 122, 123 and video controller 16 described with reference to FIG. 17.

When an image obtained via camera unit 21 is fixed with first display unit 5 used as a viewfinder, in first display unit 5 a 2D image display mode is set. More specifically in the first embodiment when mobile phone 1 for example has a key pressed to set a shooting mode, in first display unit 5 the 2D image display mode is set.

An image obtained via camera unit 21 before it is particularly converted for a 3D image is normally not distinguished by an image for the right eye and that for the left eye. The image is generated in a 2D image. As such in first display unit 5 2D/3D switching liquid crystal device 150 is switched for a 2D image and data of an image obtained via camera unit 21 is also input from first memory 42 to first display driver 43 and therein input to video controller 126 and stored therein at memory 127 for display, directly. Thus the image obtained via camera unit 21 is continuously displayed two-dimensionally as a finder at first display unit 5 in real time until a shutter is operated.

In particular, first display unit 5 serving as a main display unit is large in size and can also readily be configured of a high definition liquid crystal device. First display unit 5 configured of such a display device allows users to enjoy not only an image obtained by a camera, as described above, but also a representation in a more beautiful 2D image.

A representation on first display unit 5 in a 3D image is effected by using content transmitted for example from a website, by mail or the like as that of 3D image data and received by mobile phone 1 of the present embodiment.

Preferably the content includes animation, a photograph of a scenery and others more suitable for displaying in a 3D image than a 2D image, or more enjoyable in a 3D image, although it is not limited thereto. It should be noted in the present embodiment, however, that in view of the display device's characteristic, it is necessary that received data's content have a data structure in the form of image data divided for the right and left eyes. Alternatively, mobile phone 1 may have a 3D conversion function incorporated therein to allow a video image obtained via camera unit 21 of mobile phone 1 to be converted to 3D image data divided for right and left eyes, respectively, for display. Alternatively, from another mobile phone having a similar function 3D image data may be transmitted, and the data may be received and displayed.

An idle screen is typically a screen set as a default screen to be displayed when a mobile phone is not used as a telephone. An idle screen can be set by the user, as desired, by selecting an image previously registered, an image obtained via a camera, or an image downloaded at a website, by mail or the like via a browser.

An idle screen in a 3D image in a device switching and displaying each image of 2D and 3D images is displayed in a 3D format in a 3D image display mode by inputting image data for the right eye and that for the left eye to the first display driver 43 video controller 126 and rearranging the data in video controller 126. Representation in a 3D image is suitable for displaying photographs, pictures and the like by bit map, or animation, providing an enjoyable screen.

Figure 4:
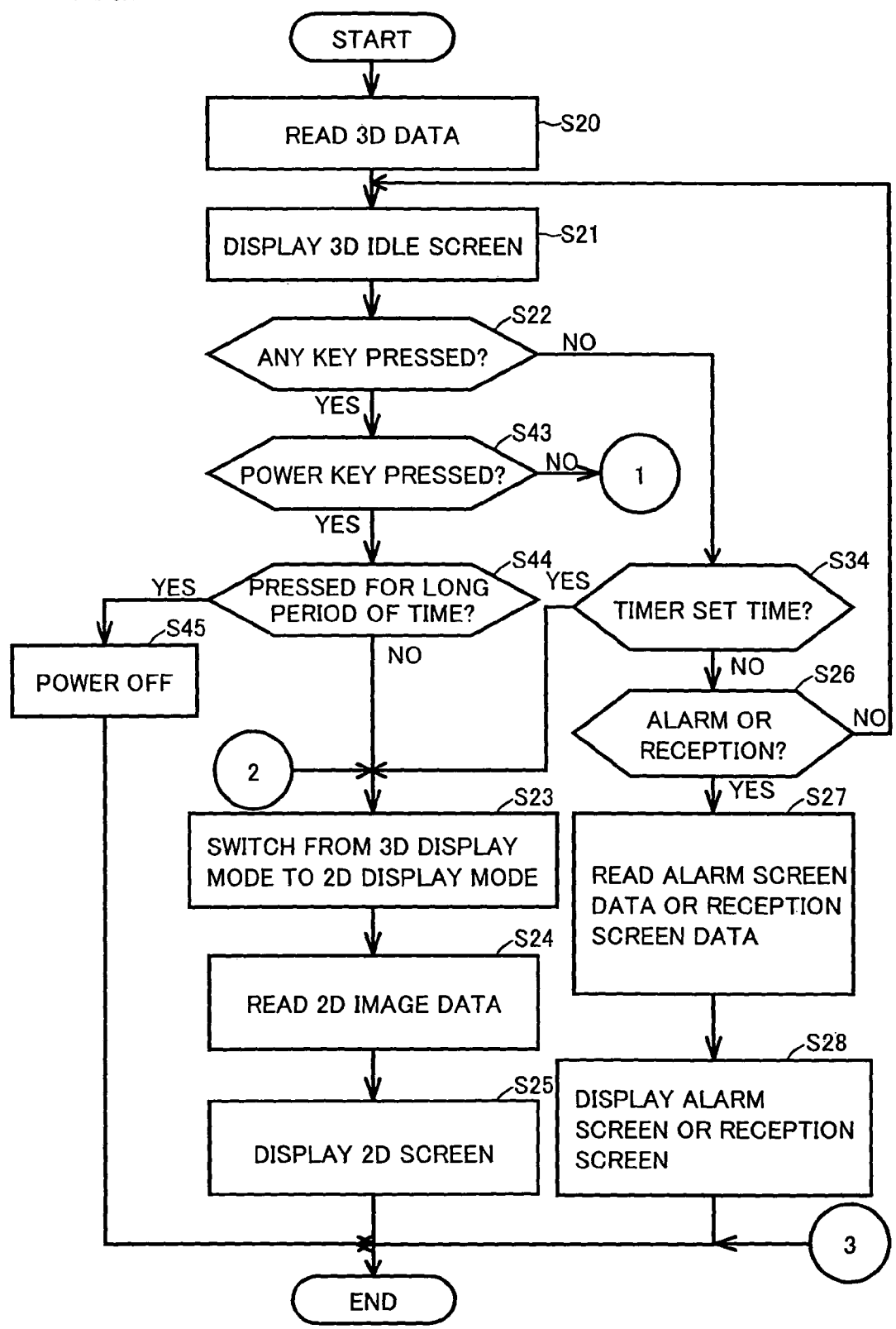
FIGS. 4 and 5 are a first flowchart of a screen control process in mobile phone 1 of the present invention in a first embodiment.
Figure 5:
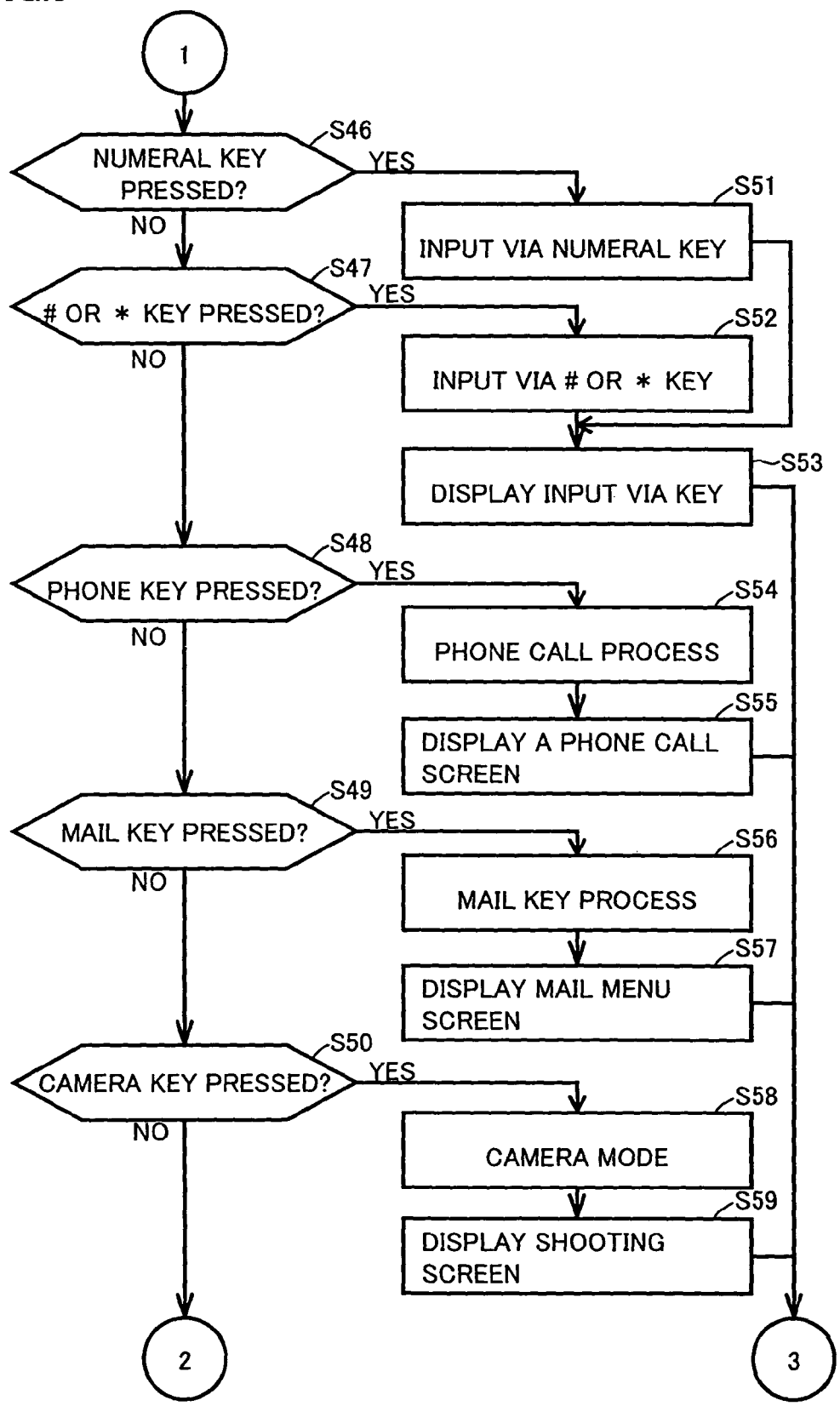

FIGS. 4 and 5 are a flow chart for illustrating an operation of a mobile phone 1 of the first embodiment to effect controlling a screen depending on a key that is pressed.

Furthermore, in the present mobile phone, control unit 40 and any memory configure a counter counting a time in which a 3D image is displayed.

Note that the following example will be described with first display unit 5 displaying any screen including an idle screen in a 3D image, this is also additionally applied when, as has been described above, content of 3D image data received from a website or by mail is reproduced and seen, a video image obtained via camera unit 21 of mobile phone 1 is converted to 3D image data and displayed, or when an image previously picked up that is recorded in a memory or a similar recording medium is read therefrom and displayed.

An idle screen in a 3D image is normally set as a default screen and, as has been described previously, can be set by a user, as desired, by selecting an image previously registered, an image obtained via a camera, or an image downloaded at a website, by mail or the like via a browser. With reference to FIG. 4, when as a default screen an idle screen in a 3D image is set, in first display unit 5 a 3D display mode is set and 3D image data for the 3D idle screen is read from third memory 52 to first memory 42 (S20). The 3D image data in first memory 42 is input to first display driver 43 and first display unit 5 displays an idle screen in a 3D image (S21).

Then if any key is pressed to input signal of an indication to control unit 40 (YES at S22) control unit 40 determines whether which key has been pressed. If it is a power key (YES at S43) and the key is also pressed for a long period of time (YES at S44) then the control unit 40 controls the power supply to be turned off (S45).

If the pressed key is the power key (YES at S43) and it is not pressed for a long period of time (NO at S44) then control unit 40 switches first display unit 5 from a 3D display mode to a 2D display mode (S23). Simultaneously, from third memory 52, 2D image data for a 2D screen is read to first memory 42 (S24) and input to first display driver 43 and on first display unit 5 the screen is displayed in a 2D image (S25).

Furthermore, with reference to FIG. 5, if the pressed key is a key other than the power key, a numeral key, a "#" key or a "*" key, a phone key, a mail key and a camera key, as described later, (NO at all of S46-S49), e.g., it is a multi-guide button 13 formed of a 4-direction button and a decision button pressed to select a upward/downward/rightward/leftward direction on a function selecting screen and make a decision on the screen, control unit 40 also similarly switches first display unit 5 from the 3D display mode to the 2D display mode (S23). Simultaneously, from third memory 52, 2D image data for a 2D screen is read to first memory 42 (S24) and input to first display driver 43 and on first display unit 5 the screen is displayed in a 2D image (S25).

The 2D image data switched and displayed at S25 may be an indication of a warning or it may be an idle screen in a 2D image that is set previously.

The key that switches the display mode of first display unit 5 is a key a primary function of which does not immediately become effective when it is pressed in an idle state. By pressing these keys, first display unit 5 can be switched at any time compulsorily from an idle screen in a 3D image to a 2D screen easy to observe even for relatively long periods of time.

By contrast, when a key that immediately requires an operation as keyed is pressed, control unit 40 initially clears a 3D screen indication and also switches first display unit 5 from the 3D display mode to the 2D display mode and then performs a process required for a screen that corresponds to the pressed key. A screen displayed in the 2D display mode is convenient particularly in displaying coded characters and the like and also advantageously easy to observe.

More specifically, with reference to FIG. 5, if the pressed key is not the power key (NO at S43) but a numeral key (YES at S46) control unit 40 clears a 3D screen indication and accepts the entry via the numeral key (S51). Furthermore, if the pressed key is the "#" key or the "*" key (YES at S47) control unit 40 clears a 3D screen indication and accepts the entry via the "#" or "*" key (S51) and causes first display unit 5 to display the pressed key (S53).

Furthermore, if the pressed key is the phone key (YES at S48), control unit 40 clears a 3D screen indication and performs a phone call process (S54) and causes first display unit 5 to display a phone call screen (S53).

Furthermore, if the pressed key is the mail key (YES at S49) then control unit 40 clears a 3D screen indication and performs a mail key process corresponding to the mail key (S56) and causes first display unit 5 to display a mail menu screen (S57).

Furthermore if the pressed key is the camera key (YES at S50) then control unit 40 clears a 3D screen indication and starts a shooting mode (S58) and causes first display unit 5 to display a shooting screen (S59).

Note that when control unit 40 clears a 3D screen indication at S51, S52, S54, S56, S58, the control unit 40 can simultaneously switch first display unit 5 from the 3D display mode to the 2D display mode to allow smooth 2D indication.

Note that furthermore as shown in the FIG. 4 and FIG. 5 flow charts, when an alarm time has been arrived at or a phone call or mail has been received, first display unit 5 can also be switched from the 3D to 2D display modes to allow a 2D image to be used to display the alarm or that the phone call or the mail has been received as such is easy to observe and convenient.

More specifically, with reference to FIG. 4, when there is no key pressed (NO at S22) and the counter that counts a time in which a 3D image is displayed, as has been described previously, has counted a time previously set by a timer (YES at S34) control unit 40 switches first display unit 5 from the 3D to 2D display modes (S23). Simultaneously from third memory 52, 2D image data for a 2D screen is read to first memory 42 (S24) and input to first display driver 43 and on first display unit 5 the screen is displayed in a 2D image (S25).

If it is not the previously timer set time (NO at S34) and an alarm time has arrived or a phone call or mail has been received (YES at S26) control unit 40 clears a 3D screen indication, similarly as has been described above, and for the alarm reads image data for an alarm screen from third memory 52 to first memory 42 and for the phone call or mail received reads image data for a screen for reception from third memory 52 to first memory 42 (S27). The image data in first memory 42 is input to first display driver 43 to allow first display unit 5 to display the alarm screen or the phone call or mail reception screen in a 2D image (S28).

If it is not an alarm time nor phone call nor mail reception (NO at S26) control unit 40 continues to cause first display unit 5 to display an idle screen in a 3D image (S21).

FIG. 6 is a list of screens displayed by mobile phone 1 and operations thereby when each key is pressed or when no key is pressed and an alarm notice or a phone call or mail reception or a similar state has been input.

With reference to FIG. 6, mobile phone 1 when the power key is pressed for a long period of time operates to turn the power supply off and when the power key is pressed for a short period of time displays a 2D screen. FIG. 6 shows in connection with each key how a screen indication changes and an operation after the key is pressed, as has been described previously with reference to the flow chart. Note that while in the above described embodiment in switching to a 2D screen a previously set screen is newly read from third memory 52, 3D image data for an idle screen in a 3D image may be used to create 2D image data for a 2D screen. 3D image data can be converted to 2D image data by utilizing one of an image of a 3D image for the right eye and that of the 3D image for the left eye and for example adjusting the same in size.

Figure 7:
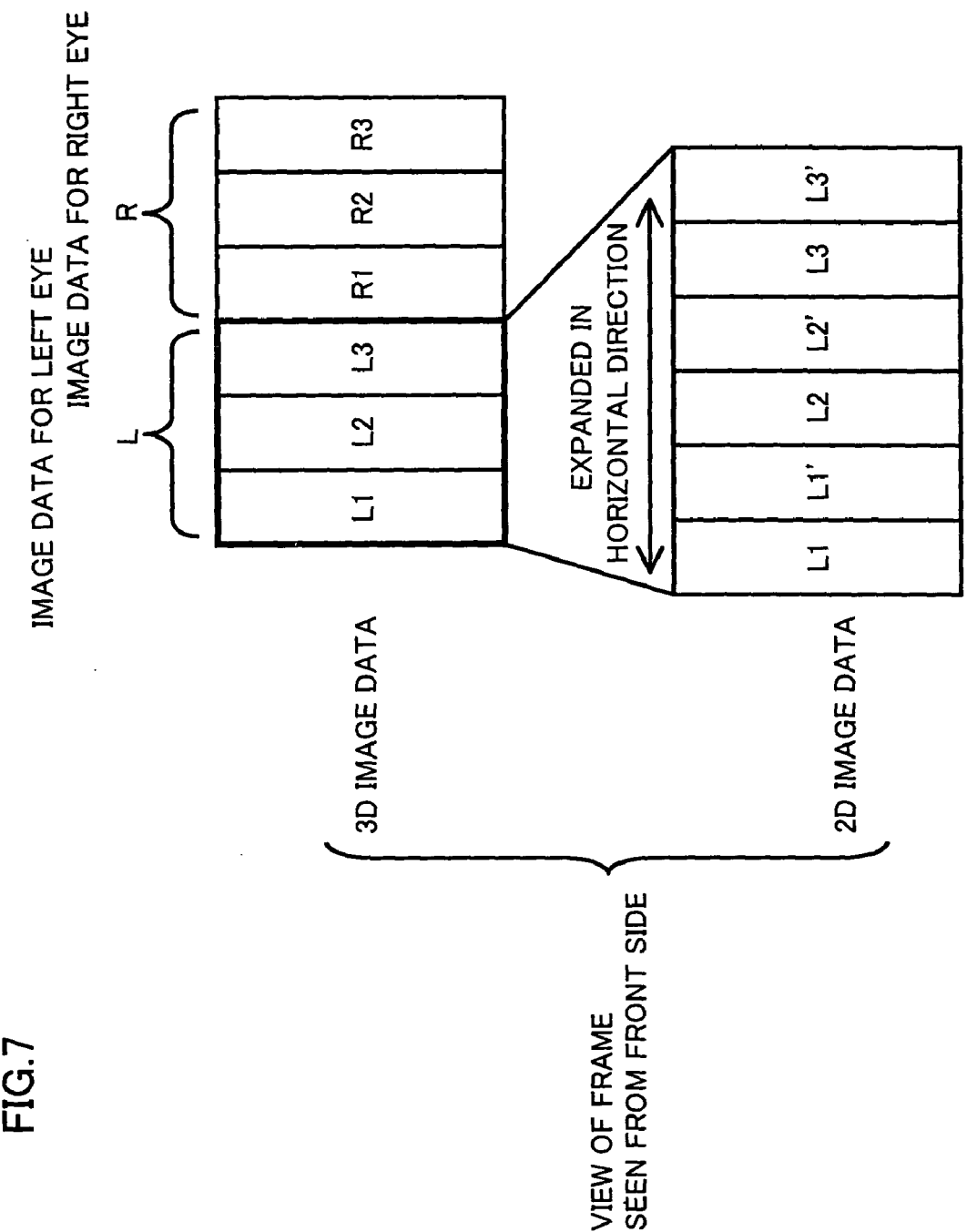
FIGS. 7 and 8 schematically represent a specific example of a method of creating 2D image data from 3D image data.

FIG. 7 schematically shows a specific example of a method effected in image processing portion 41 that uses 3D image data to create 2D image data. The 3D image data is configured with image data for the left eye L and image data for the right eye R horizontally arranged, as shown in FIG. 7. Image processing portion 41 divides image data L into elongate, rectangular block L1, L2, L3 laterally having one pixel and also similarly divides image data R into blocks R1, R2, R3. The 2D image data is created by enlarging image data L of the 3D image data (in FIG. 7, the portion surrounded by a thick frame) to be doubled in a horizontal direction. It can be enlarged by simply copying each elongate block (L1'=L1 or the like) or employing an interpolation using a value of neighboring pixel (L1'=(L1+L2)/2 or the like). In the interpolation, rather than a simple average value, a lowpass filter of no less than 3 taps may be used.

Note that while in the above description image processing portion 41 creates 2D image data from image data L of 3D image data, it may create 2D image data from image data R.

Furthermore, for a background portion in 3D image data with small parallax, image data L and image data R may both be used to create 2D image data, as will be described hereinafter in a specific example.

Figure 8:
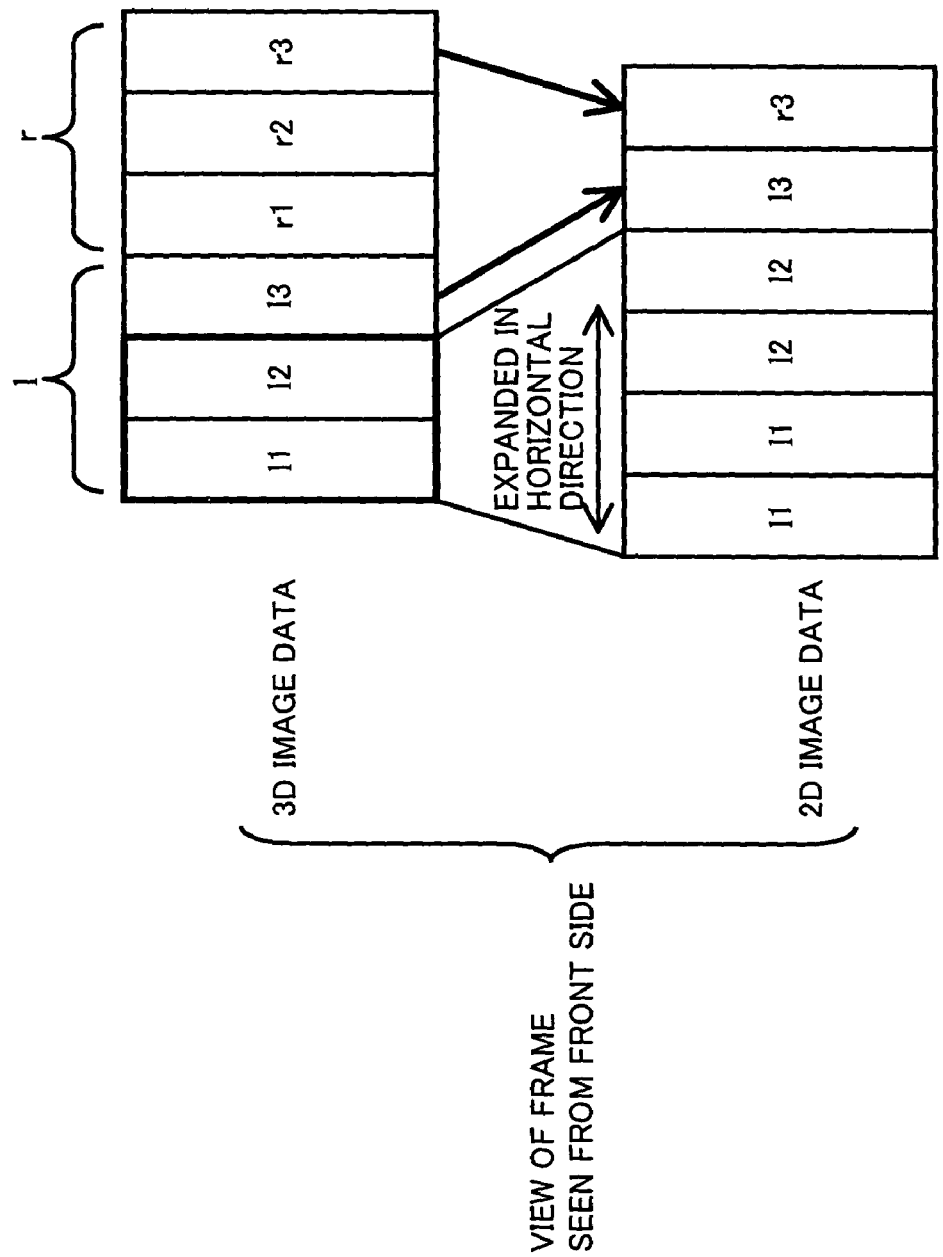

FIG. 8 schematically shows a specific example of another method employed in image processing portion 41 that uses 3D image data to create 2D image data. The 3D image data is configured of image data for the left eye l and that for the right eye r. Similarly as has been shown in FIG. 7, image processing portion 41 divides image data l laterally in rectangles to provide blocks l1, l2, l3 and image data r laterally in rectangles to provide blocks r1, r2, r3. For example, in the FIG. 8, of the 3D image data, the image data l that are surrounded by a thick frame, i.e., blocks l1 and l2 are a foreground region with parallax and block l3 is a background region without substantial parallax, for the sake of illustration. Initially, image processing portion 41 enlarges blocks l1, l2 to be horizontally doubled to create a foreground region of 2D image data. The blocks are enlarged, as has been described with reference to FIG. 7. Then, blocks l3 and r3 are exactly copied to create a background region of the 2D image data. Horizontal resolution of a portion with small parallax can be maintained while 2D image data can be created.

Note that while also in the above description image data l of 3D image data is used to create 2D image data, image data r may be used to create 2D image data, as described above.

Furthermore, 2D image data created by the FIG. 7 or 8 method may be filtered, since interpolation results in horizontal aliasing and using an interpolation filter results in a blurred image. In the FIG. 8 method, the 2D image data's foreground region (l1, l1, l2, l2) and background region (l3, r3) may separately be filtered and the filtering for the foreground region and that for the background region may be different in nature. For example, the foreground region may be subjected to a sharpening filter such as for edge enhancement and the background region may be subjected to a noise removal filter.

Thus when 3D image data is converted to 2D image data a screen substantially identical in content can be displayed to prevent the user from feeling discomfort. Furthermore it is not necessary to store 2D and 3D image data separately.

Furthermore, pressing any key allows first display unit 5 to have a screen to be switched in representation from a 2D image to a 3D image. In that case, contrary to the above described operation, first display unit 5 is switched to the 3D display mode and from third memory 52 to first memory 42, 3D image data for a 3D screen is also read to allow first display unit 5 to display the 3D screen.

Figure 9:
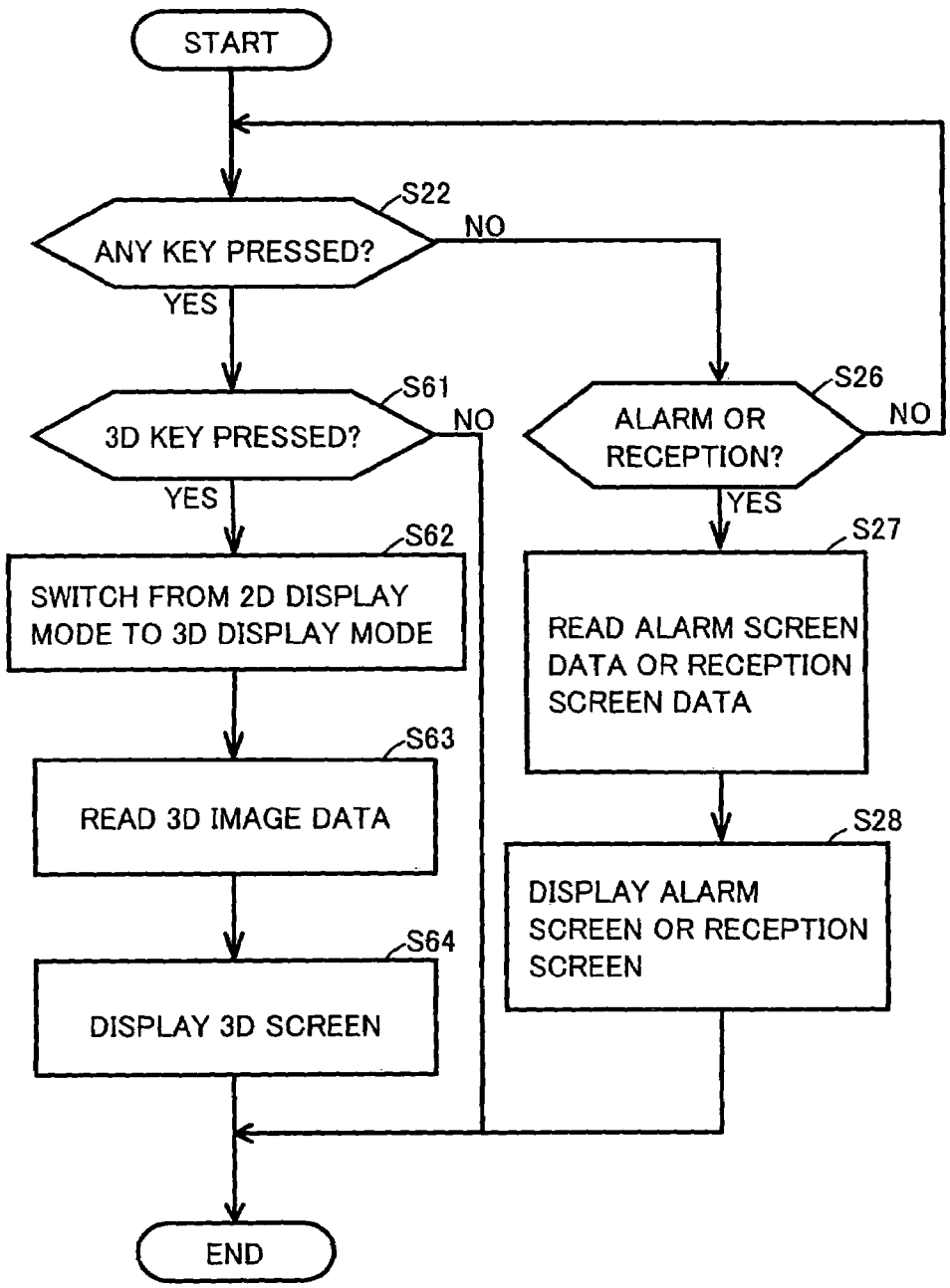
FIG. 9 is a second flowchart of a screen control process in mobile phone 1 of the present invention in the first embodiment.

FIG. 9 is a flow chart illustrating a specific example of an operation to switch from a representation in a 2D image to that in a 3D image. In FIG. 9, any operation similar to that shown in FIGS. 4 and 5 is similarly labeled and will not be described hereinafter.

With reference to FIG. 9, when a screen displayed in a 2D image is displayed on first display unit 5 and any key is pressed to input a signal of an indication to control unit 40 (YES at S22) control unit 40 identifies the key. If the key is for example a 3D key (not shown) for designating displaying in a 3D image (YES at S61) control unit 40 switches first display unit 5 from the 2D display mode to the 3D display mode (S62) and also reads 3D image data for a 3D screen from third memory 52 to first memory 42 (S63) and inputs the data to first display driver 43 and causes first display unit 5 to display the screen in a 3D image (S64).

Thus in the present embodiment mobile phone 1 allows an indication in a 3D image to be switched by pressing a key or after an elapse of a predetermined period of time to a 2D indication completely free of effect of parallax. Furthermore, the 2D image displayed can be returned simply by pressing a key to an indication in a 3D image to make an impact on the user and provide an enjoyable representation.

Figure 10A:
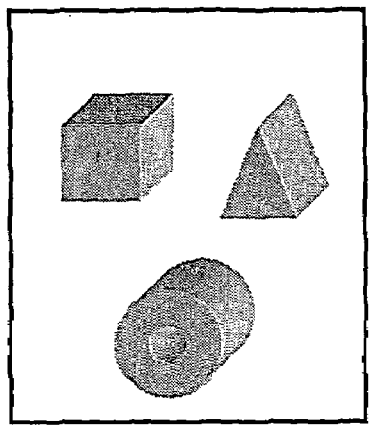
FIGS. 10A-10F show a specific example of an indication provided by mobile phone 1 at a first display unit 5.
Figure 10B:
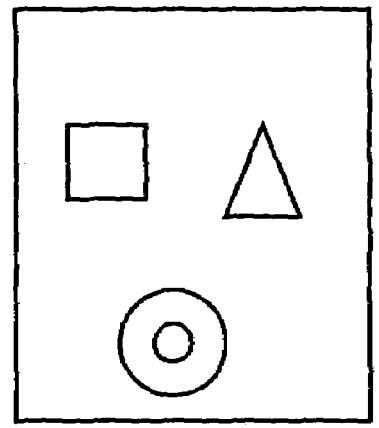
Figure 10C:
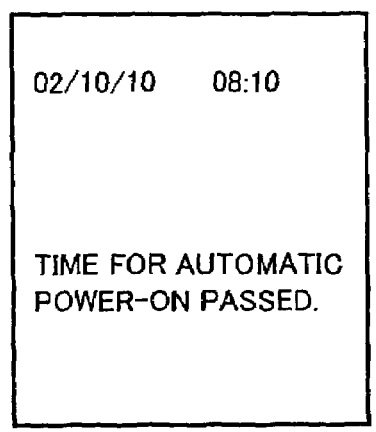
Figure 10D:
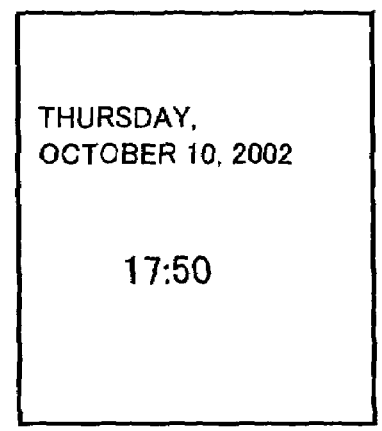
Figure 10E:
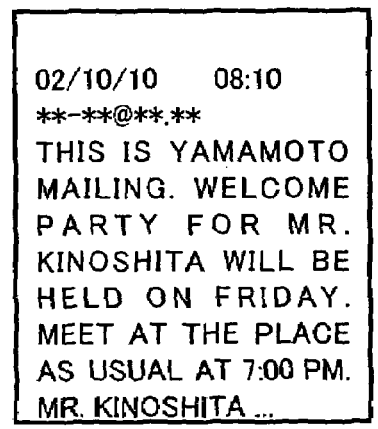
Figure 10F:
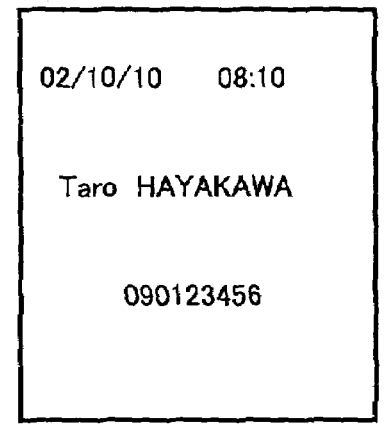

FIGS. 10A-10F show a specific example of an indication/representation switched, as provided in the first embodiment by mobile phone 1 on first display unit 5. FIG. 10A shows a specific example of displaying a screen in a 3D image. FIG. 10B shows a specific example of displaying a screen in a 2D image. FIG. 10C shows a specific example of displaying an alarm time notice screen in a 2D image. FIG. 10D shows a specific example of displaying an idle screen compulsorily switched to a 2D image after a timer set time has elapsed. FIG. 10E shows a specific example of displaying a mail reception screen in a 2D image when mail is received. FIG. 10F shows a specific example of displaying phone call reception screen in a 2D image when a phone call is received.

In the present embodiment, as has been described above, when in conversion from 3D to 2D image data the screens are to display substantially the same content, as shown in FIGS. 10A and 10B, either a 3D image's image data for the right eye or that for the left eye is utilized and displayed in a 2D image.

Furthermore, a screen displayed in a 2D image, as shown in FIGS. 10C-10F, is easy to observe and suitable for displaying coded characters and the like. In particular, a screen displayed when a phone call or mail has been received mainly contains characters, large in number. Displaying with a number of characters available on the reception screen is preferable as such can rapidly and accurately transmit information. As such, the reception screen is more suitably displayed in a 2D image, allowing characters to be readily recognized. Furthermore, a screen indicating an alarm time, as shown in FIG. 10C, also displays an indication of a set alarm time in a 2D image so that it can readily be recognized.

Note that although not shown, to inform the user of an alarm time, sound, light, vibration by a vibrator and the like may also be used together. Furthermore, when a phone call, mail or the like is received, sound, light, vibration by a vibrator or the like may similarly be used to inform the user accordingly and the received content may also be displayed with characters in a 2D image to help the user to understand the same.

Note that while as the first embodiment of the present invention the present electronics are applied to mobile phone 1 equipped with a camera, the present invention is also applicable to any electronics unequipped with a camera that are configured to include a display unit allowing 2D and 3D images to be selectively switched and displayed.

Furthermore, for example a user using a mobile phone equipped with a camera capable of picking up a 3D image may display on a display unit a 3D image currently obtained via the camera and take a picture while observing the 3D image.

Furthermore while the first embodiment has been described in conjunction with electronics configured to have first and second casings linked to allow the electronics to be foldable, the present invention is applicable to any configuration with a single casing that includes a display unit allowing 2D and 3D images to be selectively switched and displayed.

Figure 15:
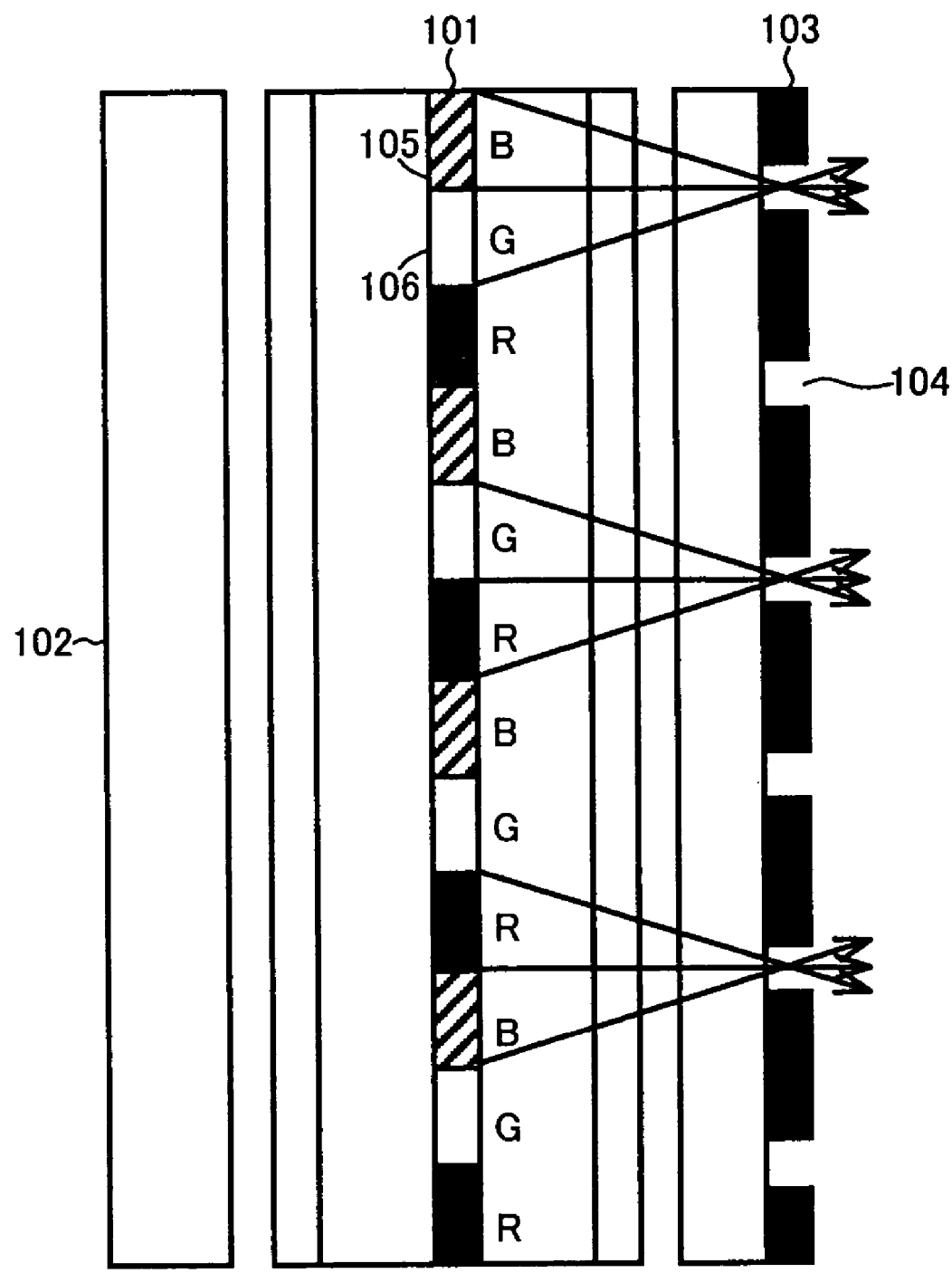
FIG. 15 shows a specific example of a configuration of a 3D display device.
Figure 16:
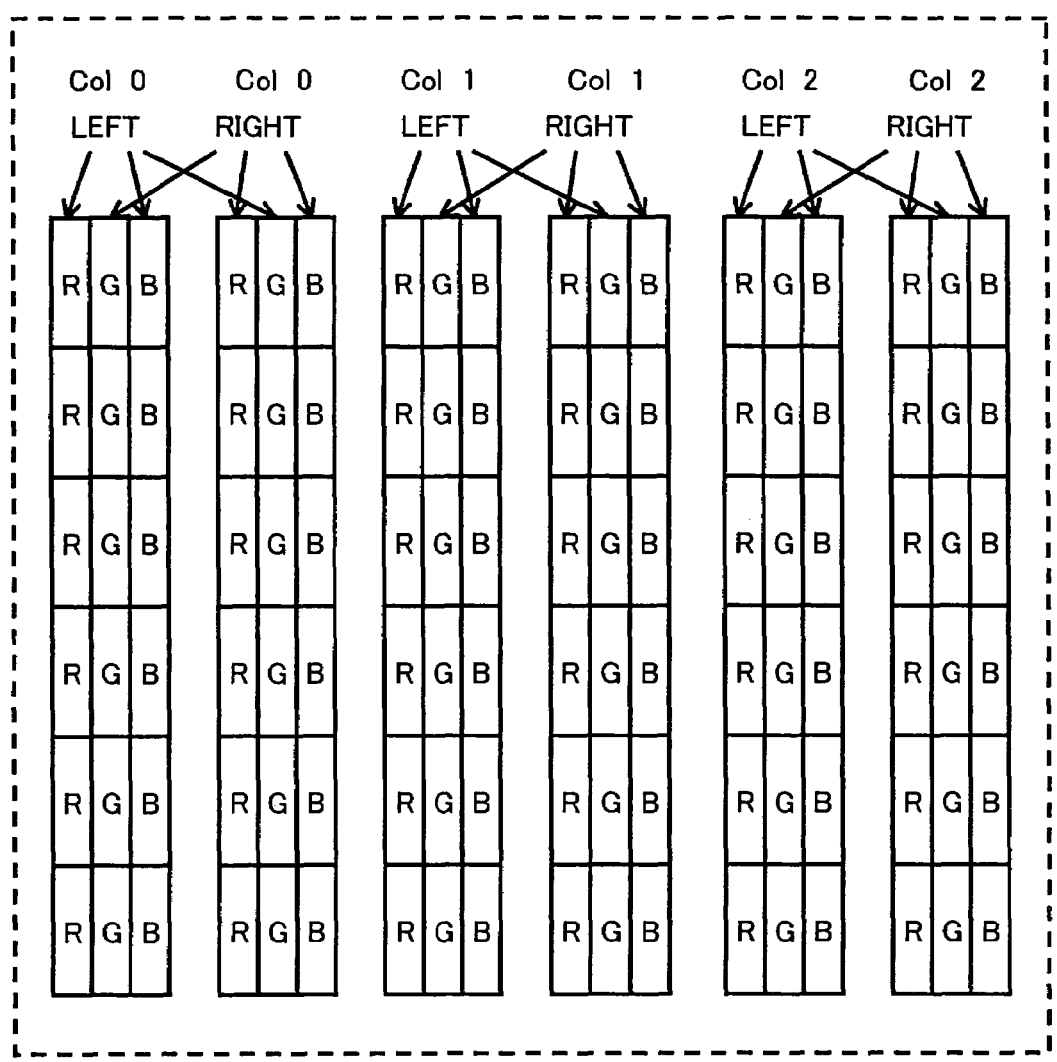
FIG. 16 is a pixel layout for illustrating a rearrangement for 3D representation.
Figure 19:
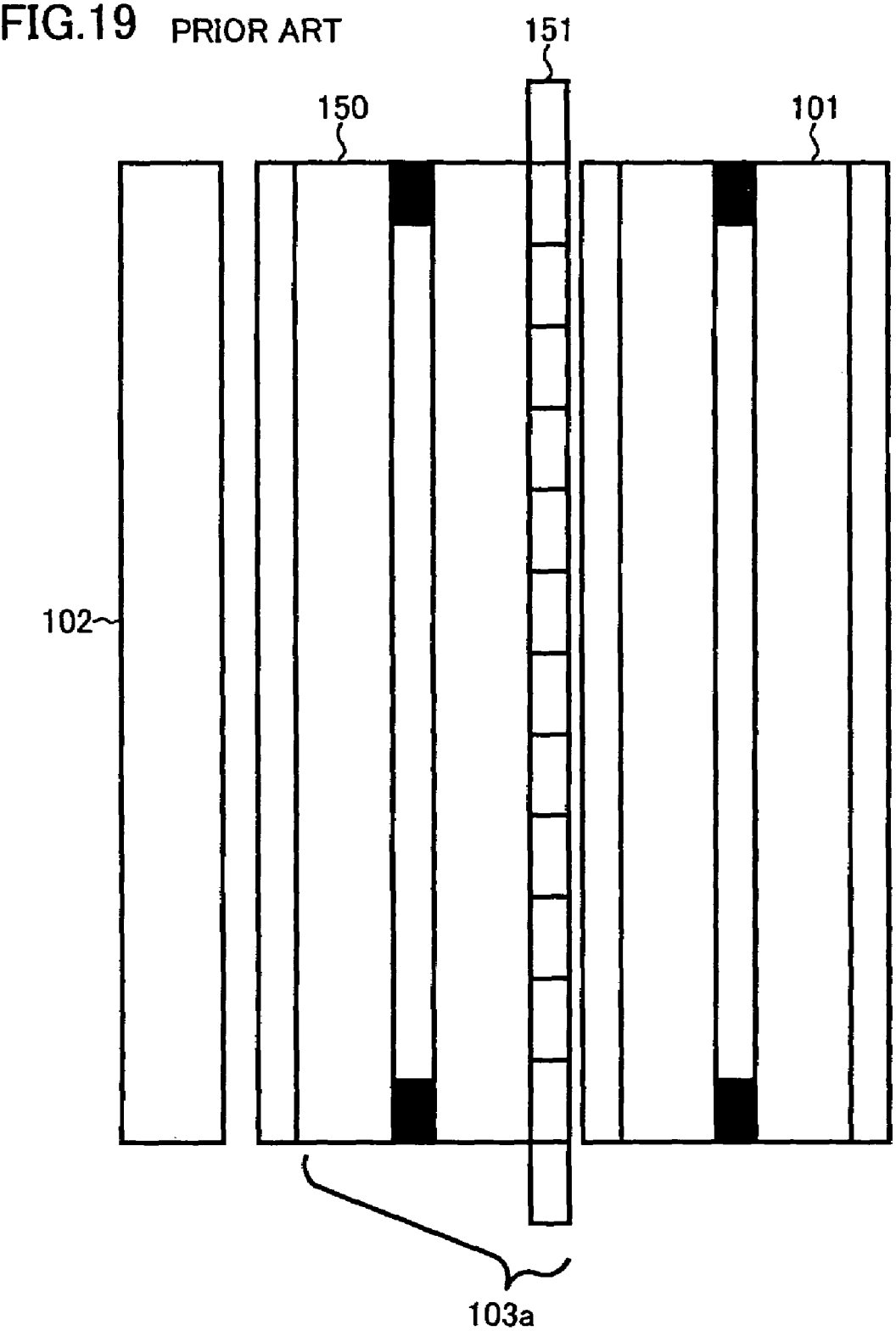
FIG. 19 is a cross section of a specific example of a configuration of a display device capable of 2D/3D switching.

Furthermore while in the first embodiment first display unit 5 has been described to be configured as shown in FIG. 19 and capable of selectively forming a parallactic optical system, the present invention is also applicable to a configuration changing data to be displayed so that parallax observed by the right and left eyes is eliminated with a parallactic optical system formed when the FIG. 15 or 19 device is used to display a 2D image.

Furthermore, the present invention is also applicable not only to mobile phones but also mobile terminals, mobile PCs and similar mobile equipment, desktop PCs or similar information equipment, and furthermore a variety of electronics including audio and video equipment.

The present electronics thus configured is effective in that when electronics including a display unit allowing 2D and 3D images to selectively be switched and displayed display a 3D image screen and it is difficult for the user to continue to see the screen for a long period of time, pressing in an idle state a key other than a numeral key, a # and * key, a phone key, a mail key and a camera key that has a primary function which does not immediately become effective when the key is pressed, can switch a representation in a 3D image to an indication of a screen displayed in a 2D image. Also advantageously, when the numeral, # and *, phone, mail, camera or similar key is pressed a 2D screen is displayed and the keyed process can immediately be performed. An efficient key operation can thus be achieved.

Furthermore, allowing a screen in a 3D image and that in a 2D image to be screens displaying substantially identical content can advantageously prevent the user from feeling discomfort when 3D and 2D images are switched. Furthermore, the necessity of separately storing 2D and 3D image data can also effectively be eliminated.

Furthermore when a 3D image is displayed, an entry via a key, a time set by a timer previously or as desired, an alarm time set as desired, or the like compulsorily switch the 3D image to a 2D image to allow the user to see an indication on an 2D image screen easy to observe.

SECOND EMBODIMENT

The present invention in a second embodiment provides camera equipped mobile phone 1 having an external appearance and internal circuit configuration similar to that described in the first embodiment with reference to FIGS. 1-3.

3D image representation needs to be observed in a specific direction. This can be difficult when the user observing the indication is on a moving vehicle. It can also be exhausting to observe the indication for a long period of time. Furthermore the user may inherently be unable to observe 3D stereoscopically. In such cases, switching the representation to a 2D image and displaying it is desired. Furthermore, if a representation in a 2D image can be switched to that providing a sense of depth, i.e., that in a 3D image, it would give an impact on the user and provide an enjoyable representation.

Figure 11:
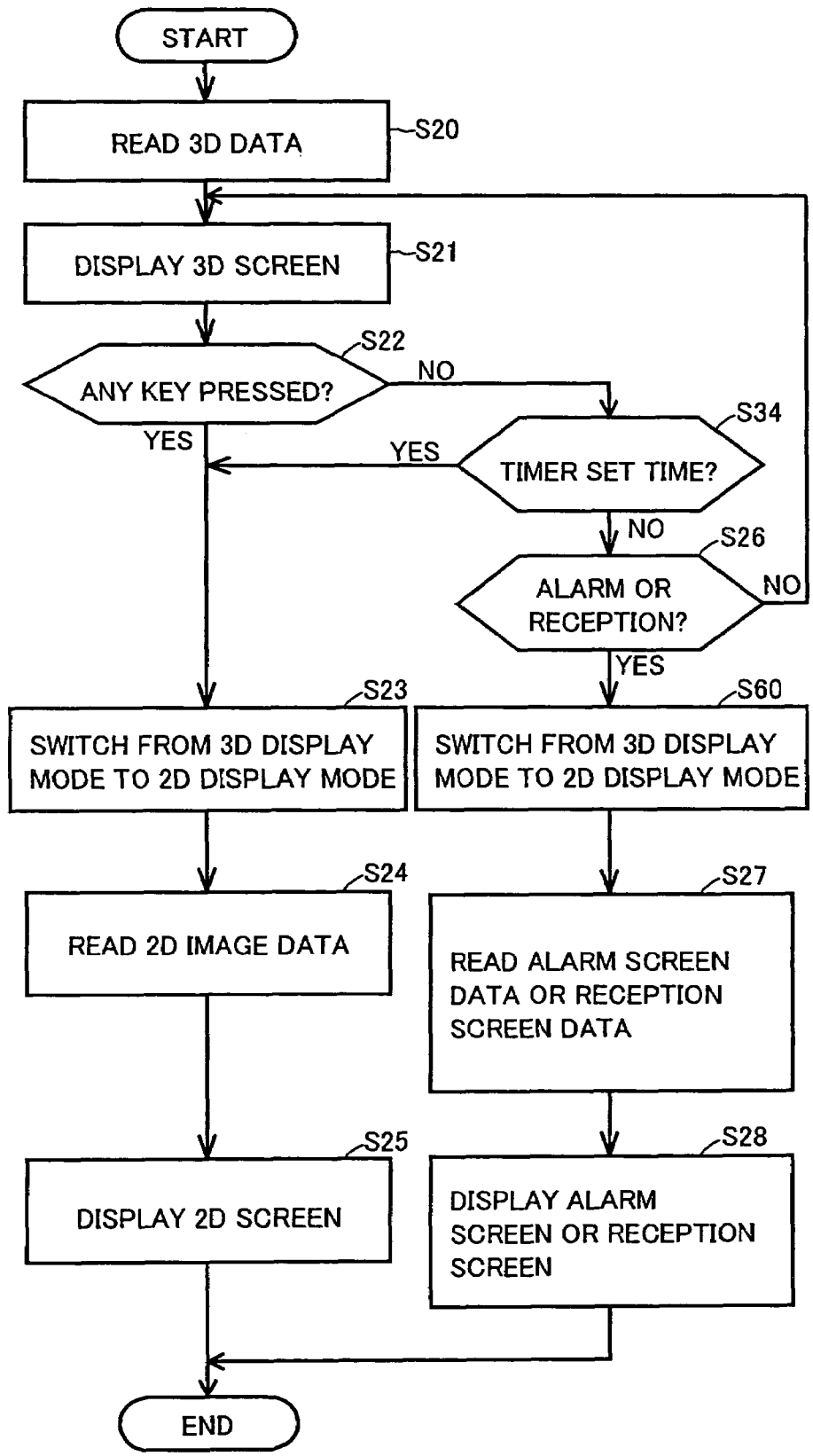
FIGS. 11-13 are flowcharts of a screen control process in mobile phone 1 of the present invention in second to fourth embodiments, respectively.

FIG. 11 is a flowchart for illustrating a specific example of an operation performed by mobile phone 1 of the second embodiment to switch from a representation in a 3D image to that in a 2D image. Any operations similar to those of mobile phone 1 in the first embodiment are similarly labeled.

With reference to FIG. 11 in mobile phone 1 of the second embodiment at S21 a screen including an idle screen and displayed in a 3D image is displayed on first display unit 5, and if any key, e.g., key groups 7, 8 shown in FIG. 1 is pressed to input a signal of a designation to control unit 40 (YES at S22) control unit 40 switches first display unit 5 from a 3D display mode to a 2D display mode (S23). Simultaneously, from third memory 52, 2D image data for a 2D screen is read to first memory 42 (S24) and input to first display driver 43 and on first display unit 5 the screen is displayed in a 2D image (S25).

In the second embodiment any key can be pressed to compulsorily switch an indication in a 3D image to that in a 2D image and for example when an indication in a 3D image is difficult to observe and is accordingly to be switched to that in a 2D image it is not necessary to select which key to be pressed and any key can be pressed to switch the indication in the 3D image to that in the 2D image advantageously. Of cause, as well as in the first embodiment, only when any selected key is pressed an indication in a 3D image may be switched to that in a 2D image.

More specifically, if there is no key pressed (NO at S22) and the counter that counts a time in which a 3D image is displayed, as has been described previously, has counted a time previously set by a timer (YES at S34), then, as has been described in the first embodiment in conjunction with the mobile phone 1 operation, control unit 40 switches first display unit 5 from the 3D to 2D display modes (S23). Simultaneously from third memory 52, 2D image data for a 2D screen is read to first memory 42 (S24) and input to first display driver 43 and on first display unit 5 the screen is displayed in a 2D image (S25).

As described above, a representation in a 3D image can be switched at a predetermined period of time or by pressing a key to that in a 2D image compulsorily. Alternatively, the automatic switching between the 2D and 3D modes, at the predetermined period of time, can be omitted. In this case, only a guiding message urging the user to switch the modes is presented at that time, and the mode switching can be done by pressing a key. A time set by a timer may previously be set by default or changed as desired by a user for example pressing a key. Furthermore, maximum acceptable time information may be contained far example in content displayed by first display unit 5 and when a 3D image is displayed this information may be read and used as a set time.

If it is not the previously timer set time (NO at S34) and an alarm time has arrived or a phone call or mail has been received (YES at S26) control unit 40 switches first display unit 5 from the 3D display mode to the 2D display mode (S60) and for the alarm reads image data for an alarm screen from third memory 52 to first memory 42 and for the phone call or mail received reads image data for a screen for reception from third memory 52 to first memory 42 (S27). The image data in first memory 42 is input to first display driver 43 to allow first display unit 5 to display the alarm screen or the phone call or mail reception screen in a 2D image so that the alarm or reception's content including characters can be identified by the user readily or without consuming time (S28).

In the second embodiment first display unit 5 provides an indication switched, similarly as has been described in the specific example described in the first embodiment with reference to FIGS. 10A-10F.

A 3D screen in a device switching and displaying each image of 2D and 3D images is displayed in a 3D format in a 3D image display mode by inputting image data for the right eye and that for the left eye to the first display driver 43 video controller 126 and rearranging the data in video controller 126. Representation in a 3D image is suitable for displaying photographs, pictures and the like by bit map, or animation, providing an enjoyable screen.

Furthermore, a 2D screen is displayed by switching first display unit 5 to a 2D image display mode and directly inputting to video controller 126 and memory 127 for display the 2D image data created by the FIG. 7 or 8 method. Herein, first display unit 5, as clearly indicated in FIG. 19, when it displays a 2D image has a liquid crystal molecule's rotation canceled by applying voltage to 2D/3D switching liquid crystal device 150 and phase different plate 151, whether patterned or not, is no longer affected by light input to the plate and a slit formed is resolved.

More specifically, when displaying in a 2D image is selected, a device structure is provided that is substantially similar to a normally used liquid crystal display device with a region displayed completely free of a parallactic optical system. An object can be displayed, unaffected by parallax of right and left and visually readily observable at any position.

While in the first embodiment 3D image data involved in displaying a 3D image is data shared with 2D image data involved in displaying a 2D image, in the second embodiment 2D image data involved in displaying a 2D image may be data shared with 3D image data involved in displaying in a 3D image. For example in the first embodiment to display in a 3D image an image obtained via camera unit 21 mobile phone 1 incorporates a 3D conversion function using a 2D image obtained via a camera to create image data for the right eye and that for the left eye. When this incorporated 3D conversion function is used to switch an indication in a 2D image to that in a 3D image, 2D image data for 2D representation may be used as common image data and the 2D image data may be used to create 3D image data for 3D representation.

Furthermore in the above embodiment first display unit 5 has been described as the FIG. 19 display device and the liquid crystal device electrically selecting whether to form a parallactic optical system has been formed of 2D/3D switching liquid crystal device 150 and patterned phase difference plate 151. Alternatively, a liquid crystal device including a pair of polarizing plates may be used to form an exact pattern operating substantially as a slit of a parallax barrier as a pattern for display. 3D and 2D are switched by turning on and off displaying the pattern.

The configuration particularly as provided above allows a pair of polarizing plates to be configured as a patterned phase different plate separately regardless of formation of an electrode of the liquid crystal device. A parallax barrier's slit can readily and more precisely be formed, and corresponding to a higher definition main display (displaying a high-resolution 2D image) a high resolution in a 3D image can be achieved, displaying a more impressive and enjoyable representation advantageously.

Note that while the second embodiment has been described in conjunction with the present electronics to camera equipped mobile phone 1, the present invention is also applicable to electronics unequipped with a camera that include a display unit allowing 2D and 3D images to selectively be switched and displayed.

Furthermore, for example a user using a mobile phone equipped with a camera capable of picking up a 3D image may display on a display unit a 3D image currently obtained via the camera and take a picture while observing the 3D image.

Furthermore while the second embodiment has also been described in conjunction with electronics configured to have first and second casings linked to allow the electronics to be foldable, the present invention is applicable to any configuration with a single casing that includes a display unit allowing 2D and 3D images to be selectively switched and displayed.

Furthermore, the present invention is also applicable not only to mobile phones but also mobile terminals, mobile PCs and similar mobile equipment, desktop PCs or similar information equipment, and furthermore a variety of electronics including audio and video equipment.

The present electronics are thus configured and do not form a parallactic optical system in 2D displaying. As such, when for example on a moving vehicle a 3D representation is difficult to observe, watching the 3D representation for a long period of time is exhausting, the user inherently cannot form a 3D stereoscopic body in his/her mind, or switching an indication to a 2D image is similarly required, the electronics advantageously allow first display unit 5 to display a readily observable 2D screen effectively.

Furthermore, 2D and 3D image data that are common allow simple, enjoyable 3D image representation and furthermore advantageously eliminates the necessity of storing 2D and 3D image data separately.

THIRD EMBODIMENT

The present invention in a third embodiment provides camera equipped mobile phone 1 having an external appearance and internal circuit configuration similar to that described in the first embodiment with reference to FIGS. 1-3.

Figure 12:
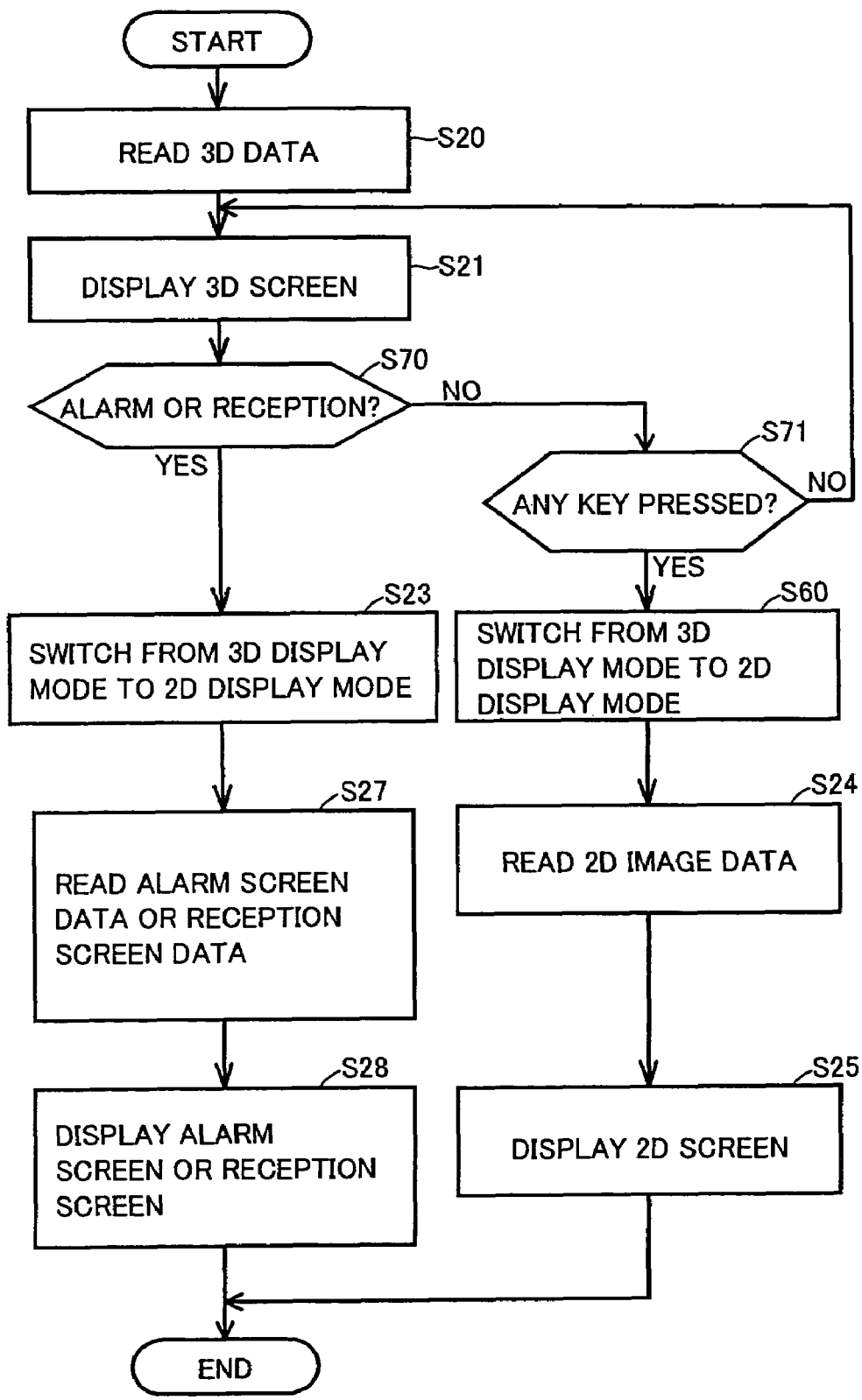

FIG. 12 is a flow chart for illustrating a specific example of an operation performed by mobile phone 1 in the third embodiment to switch from a representation in a 3D image to that in a 2D image. In FIG. 12 any operations similar to those of mobile phone 1 in the first and second embodiments are also similarly labeled and will not be described hereinafter. In the third embodiment, for an alarm time notice or when a phone call or mail has been received, control is effected to switch from displaying a screen in a 3D image to displaying a screen in a 2D image.

With reference to FIG. 12, in mobile phone 1 of the third embodiment at S21 a screen including an idle screen and displayed in a 3D image is displayed on first display unit 5, and if an alarm time has arrived or a phone call or mail has been received (YES at S70) control unit 40 switches first display screen 5 from a 3D display mode to 2D display mode (S23) and for the alarm reads image data for an alarm screen from third memory 52 to first memory 42 and for the phone call or mail received reads image data for a screen for reception from third memory 52 to first memory 42 (S27). The image data in first memory 42 is input to first display driver 43 to allow first display unit 5 to display the alarm screen or the phone call or mail reception screen in a 2D image (S28).

If it is not alarm time, or phone call or mail reception (NO at S 70) and any key is pressed to input a signal of a designation to control unit 40 (YES at S71) control unit 40 switches first display unit 5 from the 2D display mode to the 3D display mode (S60) and also reads 3D image data for a 3D screen from third memory 52 to first memory 42 (S24) and inputs the data to first display driver 43 to allow first display unit 5 to display the screen in a 3D image (S25). As has been described previously, a 3D screen needs to be seen in a predetermined direction and it sometimes difficult to observe it for a long period of time. The above described key operation can address such a case and if there is no alarm notice or phone call or mail reception, an any key can be pressed to compulsorily switch displaying a screen in a 3D image to displaying a screen in a 2D image to display a readily observable 2D image.

Furthermore, if there is not any key pressed (NO at S71) control unit 40 continues to cause first display unit 5 to continue to display an idle screen in a 3D image (S21).

In the third embodiment first display unit 5 also provides a representation switched, similarly as has specifically been exemplified in the first embodiment with reference to FIGS. 10A-10F.

Note that while as the third embodiment of the present invention the present electronics are applied to mobile phone 1 equipped with a camera, the present invention is also applicable to any electronics unequipped with a camera that are configured to include a display unit allowing 2D and 3D images to be selectively switched and displayed.

Furthermore, for example a user using a mobile phone equipped with a camera capable of picking up a 3D image may display on a display unit a 3D image currently obtained via the camera and take a picture while observing the 3D image.

Furthermore while the third embodiment has been described in conjunction with electronics configured to have first and second casings linked to allow the electronics to be foldable, the present invention is applicable to any configuration with a single casing that includes a display unit allowing 2D and 3D images to be selectively switched and displayed.

Furthermore while in the first embodiment first display unit 5 has been described to be configured as shown in FIG. 19 and capable of selectively forming a parallactic optical system, the present invention is also applicable to a configuration changing data to be displayed so that parallax observed by the right and left eyes is eliminated with a parallactic optical system formed when the FIG. 15 or 19 device is used to display a 2D image.

Furthermore, the present invention is also applicable not only to mobile phones but also mobile terminals, mobile PCs and similar mobile equipment, desktop PCs or similar information equipment, and furthermore a variety of electronics including audio and video equipment.

With the present electronics thus configured, during displaying a 3D screen such as an idle screen in a 3D image when an alarm notice is issued or a phone call or mail is received or the like the indication in the 3D image can be switched to an alarm notice screen or a phone call or mail reception screen in a 2D image to provide an indication easy for the user to recognize its content.

FOURTH EMBODIMENT

The present invention in a fourth embodiment provides camera equipped mobile phone 1 having an external appearance and internal circuit configuration similar to that described in the first embodiment with reference to FIGS. 1-3.

Figure 13:
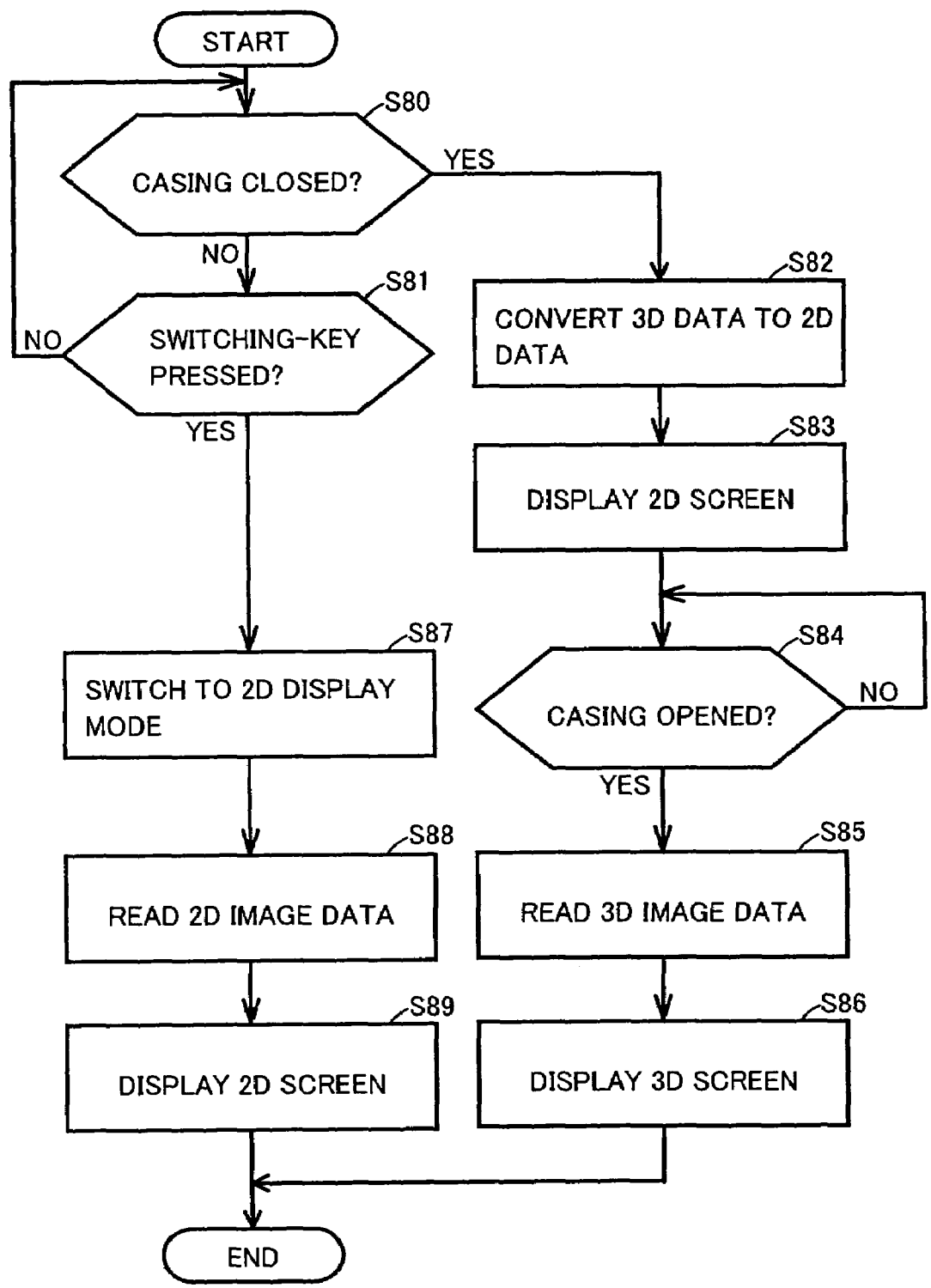
Figure 14:
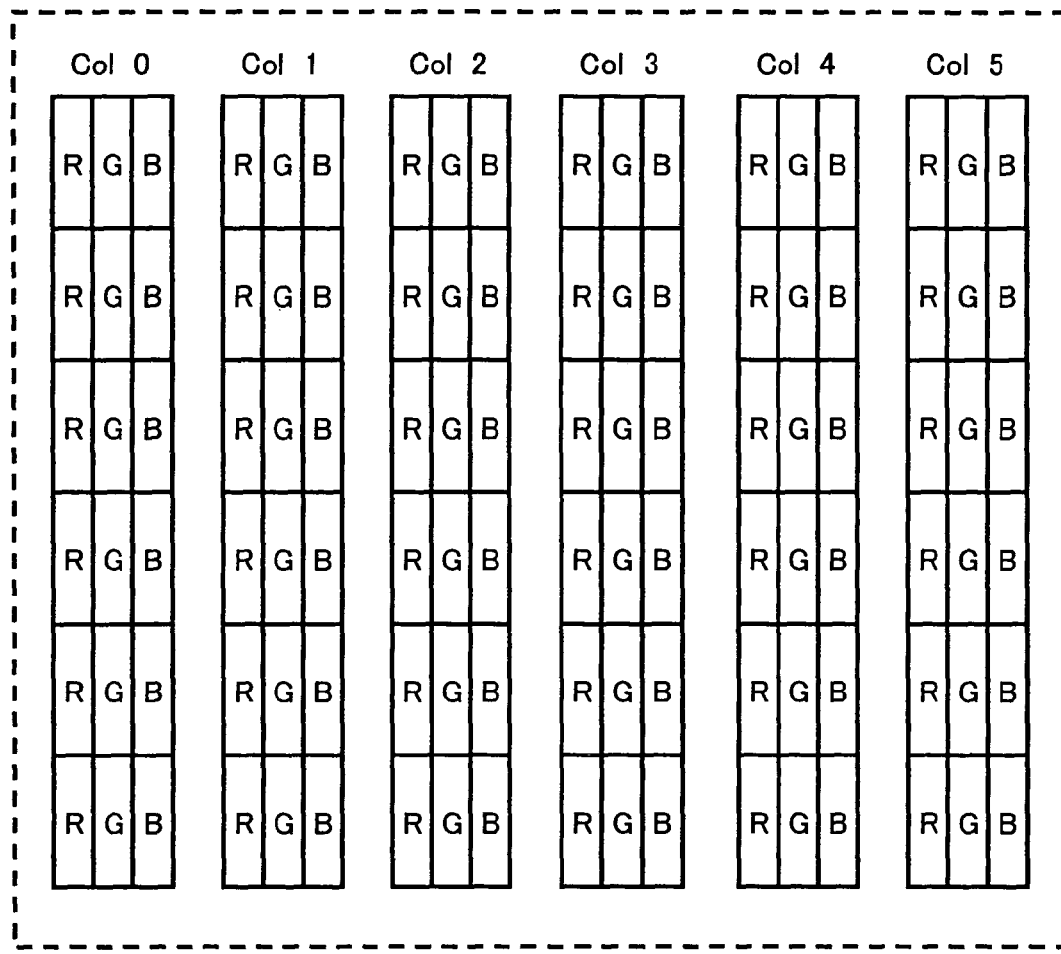
FIG. 14 shows a liquid crystal pixel layout.

FIG. 13 is a flowchart for illustrating how in mobile phone 1 of the fourth embodiment an idle screen is controlled as the phone is flipped open or closed.

In the FIG. 13 flowchart at the START mobile phone 1 is flipped open, first display unit 5 is in a 3D display mode and also displays an idle screen in a 3D image. More specifically, in this condition, 3D image data for a 3D idle screen that has been read from third memory 52 to first memory 42 is input to first display driver 43 and first display unit 5 displays the idle screen in a 3D image.

With reference to FIG. 13, when mobile phone 1 is closed with first display unit 5 displaying an idle screen in a 3D image, open/close detector 49 detects that the phone has been closed (YES at S80), image processing portion 41 converts 3D image data to 2D image data for displaying in a 2D image (S82) and control unit 40 inputs the 2D image data to second driver 44. Thus second display unit 20 displays the idle screen in a 2D image (S83).

At S82, 3D image data can be converted to 2D image data, as has been described with reference to FIGS. 7 and 8. In the present embodiment mobile phone 1 having a closed position and that having an open position can display idle screens, respectively, showing substantially identical contents to prevent the user from feeling discomfort. Furthermore, it is not necessary to store 2D and 3D image data separately.

When mobile phone 1 is again flipped open (YES at S84), with first display unit 5 in the 3D display mode with an idle screen in a 3D image remaining set as an idle screen, detector 49 detects that the phone is flipped open and first display unit 5 responsively displays the idle screen in the 3D image. More specifically, control unit 40 reads 3D image data for an idle screen in a 3D image from third memory 52 to first memory 42 (S85) and inputs the data to first display driver 43 to allow first display unit 5 to display the idle screen in the 3D image (S86).

Note that mobile phone 1 can switch from a 3D to a 2D image an idle screen displayed on first display unit 4. For example, mobile phone 1 is not closed and for example by pressing a key corresponding to that which switches an idle screen (NO at S80 and YES at S81) an idle screen displayed on first display unit 5 can be switched from a 3D image to a 2D image. More specifically, when the key corresponding to that which switches an idle screen is pressed to input a signal of a designation to control unit 40 (YES at S81) control unit 40 switches first display unit 5 from the 3D display mode to the 2D display mode (S87) and also reads 2D image data for an idle screen in a 2D image from third memory 52 to first memory 42 (S88) and inputs the data to first display driver 43 and causes first display unit 5 to display the idle screen in the 2D image (S89).

Note that although not shown in FIG. 13, as well as in the first to third embodiments, the key corresponding to that which switches an idle screen or another any key can be pressed to switch an idle screen displayed on first display unit 5 from a 2D image to a 3D image. In that case, contrary to the above described operation, first display unit 5 is switched to the 3D display mode and also from third memory 52 to first memory 42, 3D image data for an idle screen in a 3D image is read and first display unit 5 displays the idle screen in the 3D image.

An idle screen in a 3D image in a device switching and displaying each image of 2D and 3D images is displayed in a 3D format in a 3D image display mode by inputting image data for the right eye and that for the left eye to the first display driver 43 video controller 126 and rearranging the data in video controller 126. Representation in a 3D image is suitable for displaying photographs, pictures and the like by bit map, or animation, providing an enjoyable screen.

However, when mobile phone 1 flipped open with first display unit 5 displaying an idle screen in a 3D image is folded second display unit 20 can only display a 2D image. Accordingly in the present embodiment when mobile phone 1 in the open position and that in the closed position are both to have first and second display units 5 and 20 display substantially the same content, of a 3D image, one of image data for the right eye and that for the left eye is used to be displayed in a 2D image. This switching in displaying will not be described in a specific example as it has previously been described with reference to FIGS. 10A and 10B.

Alternatively, when mobile phone 1 is folded open/close detector 49 may detect that the phone has been folded and control unit 40 may newly read an idle screen dedicated to a 2D image that is stored in third memory 52 and input it to second display driver 44 and causes second display unit 20 to display it. In that case, content to be displayed can be set for first and second display units 5 and 20 independently.

An idle screen with mobile phone 1 folded, i.e., an indication on second display unit 20 is a 2D image, which is easy to observe and suitable for displaying content including coded characters or the like.

Furthermore, when a 3D image is set as an idle screen in first display unit 5, and mobile phone 1 is flipped open, responsively control unit 40 needs to change and handle a data structure for display. More specifically, first display unit 5 is switched to the 3D display mode and data to be displayed is also switched to that having 3D image data for the right eye and that for the left eye. Thus when mobile phone 1 is flipped open it can also similarly be suitable for displaying photographs, pictures and the like by bit map or animation and provide an enjoyable screen.

Thus mobile phone 1 in the fourth embodiment first and second display units 5 and 20 are different display units. However, first display unit 5 that can be switched between 2D and 3D display modes and control unit 40 that can handle a data structure for display in response to mobile phone 1 being folded allow first display unit 5 to display an idle screen in a 3D image.

Note that when first display unit 5 is switched from the 3D display mode to the 2D display mode or vice versa, of a 3D image one of image data for the right eye and that for the left eye may be used to be displayed in a 2D image, as has been described above.

Note that while as the fourth embodiment of the present invention the present electronics are applied to mobile phone 1 equipped with a camera, the present invention is also applicable to any electronics unequipped with a camera that are configured to include a display unit allowing 2D and 3D images to be selectively switched and displayed.

Furthermore, for example a user using a mobile phone equipped with a camera capable of picking up a 3D image may display on a display unit a 3D image currently obtained via the camera and take a picture while observing the 3D image.

While the fourth embodiment has also been described in conjunction with electronics having first and second casings linked to allow the electronics be foldable, a single casing may be used. In that case, first and second display units 5 and 20 can be switched for display by pressing a key to allow first display unit 5 to display an idle screen depending on a 3D image. More specifically, for example, whenever a single button is pressed first and second display units 5 and 20 may alternately be switched for display, or two buttons may be used and when one button is pressed one display unit may be switched to the other unit for display and when the other button is pressed the other display unit may be switched to one display unit for display.

Furthermore while in the fourth embodiment first display unit 5 has been described to be configured as shown in FIG. 19 and capable of selectively forming a parallactic optical system, the present invention is also applicable to a configuration changing data to be displayed so that parallax observed by the right and left eyes is eliminated with a parallactic optical system formed when the FIG. 15 or 19 device is used to display a 2D image.

While the present electronics in the fourth embodiment have been described as mobile phone 1, the electronics are not limited to a mobile phone and the present invention is applicable to any electronics that are notebook PCs, personal digital assistance (PDA) or the like that are configured to be foldable and have a pickup unit and an image storage function.

When the present electronics corresponding to mobile electronics with 2D and 3D display function having first and second casings linked to allow the electronics to be foldable and including a first display unit located inside in the folded position and allowing 2D and 3D images to selectively be switched and displayed and a second display unit located outside in the folded position and displaying a 2D image that operate as described above are opened or have an open position the electronics can advantageously allow first display unit 5 to display an idle screen in a 3D image as desired.

Furthermore the electronics that can display in both the folded and open positions an idle screen having substantially the same content can prevent the user from feeling discomfort and also effectively eliminate the necessity of separately storing 2D and 3D image data.

Furthermore while in the above embodiments a 3D image is configured of images of two eyepoints such as that of the right eye and that for the left eye, the 3D image is not limited thereto and may be configured of images of at least n eyepoints, wherein n is an integer of no less than two.

In that case, the mobile phone, as well as when a 3D image is formed of images of two eyepoints, as described above, subjects a 2D image to 3D conversion to convert the image to a 3D image formed of images of n eyepoints to create a 3D image, and the 3D image created that are formed of images of n eyepoints is rearranged in dots in a order in which the eyepoints are adjacent such that the eyepoints' images are arranged in order adjacently for display. Furthermore the mobile phone forms an eyepoint barrier on a side opposite a front side of a display surface on a line remote from the surface by a predetermined distance and horizontal relative to the surface such that with human eyes' spacing, n eyepoints' images can be observed.

As the mobile phone is thus configured an observer moving his/her eyes on the line along the line so that a set of images of two adjacent eyepoints are incident on the right and left eyes, respectively, can observe stereoscopically a 3D image formed of images of n eyepoints.

Furthermore a 2D image can be created from a 3D image formed of images of n eyepoints, similarly as has been described with reference to FIG. 7 to create 2D image data from 3D image data formed of images of two eyepoints: from images of n eyepoints that form a 3D image an image of a single eyepoint can be extracted and expanded in a horizontal direction n times to create a 2D image.

Furthermore in doing so, similarly as has been described with reference to FIG. 8 to create 2D image data from 3D image data formed of images of two eyepoints, a portion (substantially) free of parallax may be created from a portion (substantially) free of the parallax of each of image data of n eyepoints.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Electronics comprising:
a display portion switching and displaying a two-dimensional image and a three-dimensional image;
a detection portion detecting a variation in position of said electronics;
a switching portion operative in response to said detection portion detecting said variation to switch a screen displayed on said display portion from a three-dimensional image to a two-dimensional image; and
an alarm setting portion,
wherein when an alarm set by said alarm setting portion is issued, said switching portion switches a screen displayed on said display portion from a screen in a three-dimensional image to an alarm notice screen in a two-dimensional image.

2. Electronics comprising:
a display portion switching and displaying a two-dimensional image and a three-dimensional image;
a detection portion detecting a variation in position of said electronics;
a switching portion operative in response to said detection portion detecting said variation to switch a screen displayed on said display portion from a three-dimensional image to a two-dimensional image; and
at least one of a phone call reception portion and a mail reception portion,
wherein when said phone call reception portion receives a phone call or said mail reception portion receives mail, said switching portion switches a screen displayed on said display portion from a screen in a three-dimensional image to a phone call or mail reception screen in a two-dimensional image.

3. Electronics comprising:
a display portion selectively switching and displaying a two-dimensional image and a three-dimensional image; and
a portion compulsorily switching a representation, compulsorily switching to a two-dimensional image a three-dimensional image displayed on said display portion,
wherein the three-dimensional image displayed on said display portion is an idle screen in a three-dimensional image.

4. Electronics comprising:
a display portion selectively switching and displaying a two-dimensional image and a three-dimensional image; and
a portion compulsorily switching a representation, compulsorily switching to a two-dimensional image a three-dimensional image displayed on said display portion,
wherein:

said portion compulsorily switching a representation includes a key entry portion; and when said display portion displays a three-dimensional image and said key entry portion is operated, said portion compulsorily switching a representation operates in response to a key entry operation via said key entry portion to compulsorily switch said three-dimensional image to a two-dimensional image, wherein the three-dimensional image displayed on said display portion is an idle screen in a three-dimensional image.

5. Electronics comprising:

a display portion selectively switching and displaying a two-dimensional image and a three-dimensional image; and a portion compulsorily switching a representation, compulsorily switching to a two-dimensional image a three-dimensional image displayed on said display portion, wherein:

said portion compulsorily switching a representation includes a time counting portion;

said time counting portion counts a time of displaying a three-dimensional image on said display portion; and when said display portion displays a three-dimensional image for a predetermined period of time, said portion compulsorily switching a representation switches said three-dimensional image on said display portion compulsorily to a two-dimensional image.

6. The electronics of claim 5, wherein the three-dimensional image displayed on said display portion is an idle screen in a three-dimensional image.

7. Electronics comprising:

a display portion selectively switching and displaying a two-dimensional image and a three-dimensional image;

a key entry portion for operation operated for input;

a control portion controlling switching between two-dimensional and three-dimensional formats, operative, with said display portion displaying a screen in a three-dimensional image, in response to an entry via at least any key of said key entry portion to effect a process corresponding to said entry, and an entry via a key other than said any key to switch said screen on said display portion in the three-dimensional image to a screen in a two-dimensional image, wherein data for displaying said screen in said 3D image displayed on said display portion and data for displaying said screen in said 2D image displayed on said display portion are identical.

8. Electronics comprising:

a display portion depending on a selection of formation of a parallactic optical system to switch and display a two-dimensional image and a three-dimensional image;

a representation switching portion issuing an instruction to switch a representation on said display portion between a two-dimensional image and a three-dimensional image associated with the parallactic optical system; and a data generation portion operative in response to said instruction to generate data of an indication in a two-dimensional image and data of an indication in a three-dimensional image from single data.

9. The electronics of claim 8, wherein:

said single data is configured of image data of a plurality of eyepoints; and said data generation portion generates said data of said indication in said two-dimensional image from one of said image data of one of said plurality of eyepoints.

10. The electronics of claim 8, wherein:

said single data is configured of image data of a plurality of eyepoints; said data generation portion generates said data of said indication in said two-dimensional image from a selectively, at least partially extracted portion of said image data of each said eyepoint.

11. The electronics of claim 8, wherein:

said single data is configured of image data of a two-dimensional image and said data of said indication in said three-dimensional image includes image data of a plurality of eyepoints; and said data generation portion generates said image data of said plurality of eyepoints from said image data of said two-dimensional image.

12. The electronics of claim 8, wherein said display portion is configured to include a liquid crystal device electrically selecting a presence/absence of formation of a parallactic optical system.

13. The electronics of claim 12, wherein said liquid crystal device is configured of a two-dimension/three-dimension switching liquid crystal device and a patterned phase difference plate.

14. The electronics of claim 12, wherein said liquid crystal device is configured of a liquid crystal device selectively displaying a pattern of a parallax barrier.

15. Electronics with a first casing and a second casing linked to allow said electronics to be foldable, comprising:

a first display portion located inside with said electronics folded, and selectively switching and displaying a two-dimensional image and a three-dimensional image;

a second display portion located outside with said electronics folded, and displaying a two-dimensional image; and a control portion operative in response to said electronics being folded or opened to switch an indication of an idle screen on said first display portion in a three-dimensional image and that of an idle screen on said second display portion in a two-dimensional image.

16. The electronics of claim 15, wherein:

said control portion includes an open/close detection portion detecting said electronics being open, and a detection portion detecting an idle screen in a three-dimensional image having been set; and said control portion causes said first display portion to display said idle screen in said three-dimensional image based on said electronics's opening operation detected by said open/close detection portion and a setting of an idle screen in a three-dimensional image detected by said detection portion.

17. The electronics of claim 15, wherein an idle screen displayed by said first display portion in a three-dimensional image and that displayed by said second display portion in a two-dimensional image are substantially identical in content.

18. The electronics of claim 15, wherein data displayed by said second display portion for an idle screen in a two-dimensional image is data displayed by said first display portion for an idle screen in a three-dimensional image that is converted for a two-dimensional image.

* * * * *